United States Patent
Reinke et al.

(10) Patent No.: US 12,084,577 B2
(45) Date of Patent: Sep. 10, 2024

(54) ASPHALT EMULSION SURFACE TREATMENT CONTAINING STEROL

(71) Applicants: A.L.M. Holding Company, Onalaska, WI (US); Ergon Asphalt & Emulsions, Inc., Jackson, MS (US)

(72) Inventors: Gerald H. Reinke, La Crosse, WI (US); Gaylon L. Baumgardner, Arkadelphia, AR (US); Andrew Hanz, LaCrosse, WI (US)

(73) Assignees: A.L.M. Holding Company, Onalaska, WI (US); Ergon Asphalt & Emulsions, Inc., Jackson, MS (US)

( * ) Notice: Subject to any disclaimer, the term of this patent is extended or adjusted under 35 U.S.C. 154(b) by 0 days.

(21) Appl. No.: 18/209,922

(22) Filed: Jun. 14, 2023

(65) Prior Publication Data

US 2023/0323126 A1 Oct. 12, 2023

Related U.S. Application Data

(60) Division of application No. 16/757,697, filed as application No. PCT/US2018/055443 on Oct. 11, 2018, now Pat. No. 11,718,756, which is a continuation of application No. 15/886,605, filed on Feb. 1, 2018, now Pat. No. 11,542,668.

(60) Provisional application No. 62/574,867, filed on Oct. 20, 2017.

(51) Int. Cl.
| | |
|---|---|
| C08L 95/00 | (2006.01) |
| C04B 24/02 | (2006.01) |
| C04B 26/26 | (2006.01) |
| C08K 5/05 | (2006.01) |
| C08L 91/00 | (2006.01) |
| E01C 7/35 | (2006.01) |
| E01C 11/00 | (2006.01) |
| C04B 111/00 | (2006.01) |

(52) U.S. Cl.
CPC .............. *C08L 95/00* (2013.01); *C04B 24/02* (2013.01); *C04B 26/26* (2013.01); *C08K 5/05* (2013.01); *C08L 91/00* (2013.01); *C08L 95/005* (2013.01); *E01C 7/353* (2013.01); *E01C 11/005* (2013.01); *C04B 2111/00612* (2013.01); *C04B 2111/0075* (2013.01); *C08L 2207/22* (2013.01); *C08L 2555/28* (2013.01); *C08L 2555/34* (2013.01); *C08L 2555/60* (2013.01); *Y02W 30/91* (2015.05)

(58) Field of Classification Search
CPC .......... C08L 95/00; C08L 91/00; C04B 24/02; C04B 26/26; C08K 5/05
USPC ......................................................... 404/75
See application file for complete search history.

(56) References Cited

U.S. PATENT DOCUMENTS

| | | |
|---|---|---|
| 1,112,492 A | 10/1914 | Turner |
| 2,280,843 A | 4/1942 | Oliver et al. |
| 2,286,244 A | 6/1942 | Whitacre |
| 2,392,863 A | 1/1946 | Rudd |
| 2,411,634 A | 11/1946 | Pearson |
| 2,585,336 A | 2/1951 | McCoy |
| 2,715,638 A | 8/1955 | Albrecht et al. |
| 2,728,682 A | 12/1955 | Kalinowski et al. |
| 2,793,138 A | 5/1957 | Wilkinson |
| 2,860,067 A | 11/1958 | Crews et al. |
| 3,032,507 A | 5/1962 | Wright |
| 3,044,373 A | 7/1962 | Sommer |
| 3,556,827 A | 1/1971 | McConnaughay |
| 3,691,211 A | 9/1972 | Julian |
| 3,926,936 A | 12/1975 | Lehtinen |
| 3,951,676 A | 4/1976 | Elste, Jr. |
| 4,044,031 A | 8/1977 | Johansson et al. |
| 4,549,834 A | 10/1985 | Allen |
| 4,874,432 A | 10/1989 | Kriech et al. |
| 5,234,494 A | 8/1993 | Sawatzky et al. |
| 5,437,717 A | 8/1995 | Doyle et al. |
| 5,473,000 A | 12/1995 | Pinomaa |
| 5,496,400 A | 3/1996 | Doyle et al. |
| 6,057,462 A | 5/2000 | Robinson et al. |
| 6,107,456 A | 8/2000 | Huibers et al. |
| 6,770,127 B2 | 8/2004 | Kreich et al. |
| 6,987,207 B1 | 1/2006 | Ronyak |
| 7,448,825 B2 | 11/2008 | Kasahara et al. |
| 7,575,767 B2 | 8/2009 | May et al. |
| 7,811,372 B2 | 10/2010 | Nigen-Chaidron et al. |
| 8,513,338 B2 | 8/2013 | Rodrigues |
| 8,696,806 B2 | 4/2014 | Williams et al. |
| 8,741,052 B2 | 6/2014 | Naidoo et al. |
| 8,821,064 B1 | 9/2014 | Morris et al. |
| 9,481,794 B2 | 11/2016 | Cox |
| 9,828,506 B2 | 11/2017 | Grady et al. |

(Continued)

FOREIGN PATENT DOCUMENTS

| | | |
|---|---|---|
| CA | 2965697 | 5/2016 |
| CA | 3026997 | 12/2017 |

(Continued)

OTHER PUBLICATIONS

Allen, et al. (2013) "Microstructural Characterization of the Chemo-Mechanical Behavior of Asphalt in Terms of Aging and Fatigue Performance Properties", UMI Dissertation Publishing, Proquest LLC., 162 pages.

Anderson, et al. (1994) "Binder Characterization and Evaluation, vol. 3: Physical Characterization", SHRP-A-369, Strategic Highway Research Program, 4 pages.

Anonymous, "The Use of REOB/VTAE in Asphalt (IS-235)," Apr. 13, 2016, pp. 1-92, Retrieved from the Internet: URL:http://asphaltinstitute.org/wp-content/uploads/IS235_REOB_VTAE_Asphaltinstitute.pdf [retrieved on Mar. 20, 2017].

(Continued)

*Primary Examiner* — Deve V Hall
(74) *Attorney, Agent, or Firm* — Kagan Binder, PLLC

(57) ABSTRACT

Pavement aging can be reduced by applying to an asphalt-containing pavement a topcoat layer or a surface treatment containing asphalt binder emulsion with sterols.

13 Claims, 12 Drawing Sheets

(56) References Cited

U.S. PATENT DOCUMENTS

| | | | |
|---|---|---|---|
| 9,994,485 B2 | 6/2018 | Warner et al. | |
| 10,030,145 B2 | 7/2018 | Severance et al. | |
| 10,077,356 B2 | 9/2018 | Fini | |
| 10,167,390 B2 | 1/2019 | Cox | |
| 10,669,202 B2 | 6/2020 | Reinke et al. | |
| 10,793,720 B2 | 10/2020 | Puchalski et al. | |
| 10,961,395 B2 | 3/2021 | Williams et al. | |
| 11,097,981 B2 | 8/2021 | Reinke et al. | |
| 11,124,926 B2 | 9/2021 | Fennell et al. | |
| 11,168,214 B2 | 11/2021 | Reinke et al. | |
| 11,427,697 B2 | 8/2022 | Reinke et al. | |
| 11,542,668 B2 | 1/2023 | Reinke et al. | |
| 11,667,570 B2 | 6/2023 | Reinke et al. | |
| 2003/0087789 A1 | 5/2003 | Scheffler | |
| 2003/0144536 A1 | 7/2003 | Sonnier et al. | |
| 2007/0122235 A1 | 5/2007 | Kasahara et al. | |
| 2007/0151480 A1 | 7/2007 | Bloom et al. | |
| 2010/0170417 A1 | 7/2010 | Naidoo et al. | |
| 2010/0190892 A1 | 7/2010 | Binkley | |
| 2010/0227954 A1 | 9/2010 | Naidoo et al. | |
| 2010/0305342 A1 | 12/2010 | Wong et al. | |
| 2010/0319577 A1 | 12/2010 | Naidoo et al. | |
| 2011/0020519 A1 | 1/2011 | Bowman et al. | |
| 2012/0060722 A1 | 3/2012 | Montpeyroux et al. | |
| 2014/0234027 A1 | 8/2014 | Morris | |
| 2014/0338565 A1 | 11/2014 | Severance et al. | |
| 2015/0087753 A1 | 3/2015 | Koleas et al. | |
| 2015/0329702 A1 | 11/2015 | Hwang et al. | |
| 2016/0122507 A1 | 5/2016 | Cox | |
| 2016/0160453 A1 | 6/2016 | Donelson | |
| 2016/0304718 A1 | 10/2016 | Bindschedler et al. | |
| 2016/0362338 A1* | 12/2016 | Reinke | C08K 5/05 |
| 2017/0370899 A1 | 12/2017 | Porot et al. | |
| 2018/0171146 A1 | 6/2018 | Allen et al. | |
| 2018/0209102 A1 | 7/2018 | Baumgardner et al. | |
| 2019/0152850 A1 | 5/2019 | Warner et al. | |
| 2019/0153229 A1 | 5/2019 | Reinke et al. | |
| 2020/0277497 A1 | 9/2020 | Reinke et al. | |
| 2021/0017386 A1 | 1/2021 | Reinke et al. | |
| 2022/0195193 A1 | 6/2022 | Reinke et al. | |
| 2022/0251387 A1 | 8/2022 | Reinke et al. | |
| 2023/0128467 A1 | 4/2023 | Reinke et al. | |
| 2023/0257303 A1 | 8/2023 | Reinke et al. | |

FOREIGN PATENT DOCUMENTS

| | | |
|---|---|---|
| CL | 2011002791 A1 | 4/2012 |
| CL | 2014002871 A1 | 7/2015 |
| CN | 103387749 A | 11/2013 |
| CN | 104245850 A | 12/2014 |
| CN | 104364318 A | 2/2015 |
| CN | 104629392 A | 5/2015 |
| CN | 110799597 A | 2/2020 |
| EP | 1728831 A | 12/2006 |
| GB | 233430 A | 5/1925 |
| GB | 575484 | 2/1946 |
| JP | 53-37724 A | 4/1978 |
| JP | 56-20052 A | 2/1981 |
| JP | H10-81827 A | 3/1998 |
| JP | H11-60960 A | 3/1999 |
| JP | 2005-154465 A | 6/2005 |
| JP | 2012-093108 A | 5/2012 |
| JP | 2016-509611 | 3/2016 |
| WO | WO 2001/072315 A1 | 10/2001 |
| WO | WO 2004/016336 A1 | 2/2004 |
| WO | WO 2010/110651 A1 | 9/2010 |
| WO | WO 2010/128105 A1 | 11/2010 |
| WO | WO 2013/090283 A1 | 6/2013 |
| WO | WO 2013/163463 A1 | 10/2013 |
| WO | WO 2013/163467 A1 | 10/2013 |
| WO | WO 2014/047462 A1 | 3/2014 |
| WO | WO 2015/070180 AL | 5/2015 |
| WO | WO 2016/065270 A1 | 4/2016 |
| WO | WO 2016/073442 A1 | 5/2016 |
| WO | WO 2017/011747 A1 | 1/2017 |
| WO | WO 2017/027096 A2 | 2/2017 |
| WO | WO 2017/213692 A1 | 12/2017 |
| WO | WO 2017/213693 A1 | 12/2017 |
| WO | WO 2018/031540 A1 | 2/2018 |
| WO | WO 2018/144731 A1 | 8/2018 |
| WO | WO 2019/023172 A1 | 1/2019 |
| WO | WO 2019/079101 A1 | 4/2019 |
| WO | WO 2021/011703 A1 | 1/2021 |
| WO | WO 2021/011704 A1 | 1/2021 |
| WO | 2022/232119 A1 | 11/2022 |

OTHER PUBLICATIONS

Anonymous: "Standard Method of Test for Determining the Flexural Creep Stiffness of Asphalt Mixtures Using the Bending Beam Rheometer (BBR); ASTM D 6648-01", Aug. 2001, pp. 1-14, Retrieved from the Internet: URL:ftp://185.72.26.245/Astm/1/Section04/ASTM0403/PDT/D6648.pdf, retrieved on Mar. 14, 20107.
Arnaud et al. (2009) "Digging into Asphaltenes", Analytical Chemistry, 87:38, downloaded from http://pubs.acs.Jrg/cen/coverstory/87/8738cover.html, 7 pages.
ASTM D6521-13 (2013) "Standard Practice for Accelerated Aging of Asphalt Binder Using a Pressurized Aging Vessel (PAV)", ASTM International, Published Sep. 2013, 6 pages.
B-Sitosterol from Soybeans downloaded from http://www.mpbio.com/product.php?pid=02102886, downloaded on May 21, 2015, 2 pages.
B-Sitosterol Powder, Supplier: MP Biomedicals, Printed from VWR Website, Date: Jun. 9, 2016, 1 page.
Cantrill, Richard, "Phytosterols, Phytostanols and Their Esters, Chemical and Technical Assessment", 69th JECFA, 2008, 13 pages.
Cao, et al. (2011) "Chemical Structures of Swine-Manure Chars Produced under Different Carbonization Conditions Investigated by Advanced Solid-State 13C Nuclear Magnetic Resonance (NMR) Spectroscopy ", Energy Fuels, 25:388-397.
Cox, "Asphalt Binders Containing a Glyceride and Fatty Acid Mixture and Methods for Making and Using Same", U.S. Appl. No. 62/074,526, filed Nov. 3, 2014, 64 pages.
Endo, Yasushi (1990) "Minor Components in Edible Fats and Oils" Oil Chemistry, 39(9):611-617 (English Abstract on p. 611).
Faller, R., "Chapter 1.6: Sterols and Sterol Induced Phases," from UCD Biophysics 241: Membrane Biology, Mar. 2021, 4 pp.
Farrar, et al. (2012) "Thin Film Oxidative Aging and Low Temperature Performance Grading using Small Plate Dynamic 'Shear Rheometry: An Alternative to Standard RTFO, PAV, and BBR", 5th Eurasphalt & Eurobitume Congress, 10 pages.
Fini et al. (2010) "Characterization and Application of Manure-Based Bio-Binder in Asphalt Industry", Transportation Research Board 89th Annual Meeting, 14 pages.
Fini et al. (2011) "Application of Bio-Binder from Swine Manure in Asphalt Binder", Annual Meeting, 15 pages.
Fini et al. (2011) "Chemical Characterization of Biobinder from Swine Manure: Sustainable Modifier for Asphalt binder," Journal of Materials in Civil Engineering, 23(11):1506-1513.
Fini et al. (2012) "Application of Swine Manure in Development of Bio-Adhesive" Allen D. Leman Swine Conference, p. 244.
Hanz et al., "Extended Aging of RAS Mixes with Rejuvenator", Aug. 10, 2016, Binder Expert task Group Meeting, retrieved from the Internet: URL:https://www.asphaltpavement.org/PDFs/Engineering_ETGs/Binder201609/06 Hanz Extended Aging of RAS Mixes with Rejuvenator.pdf, retrieved on Nov. 23, 2017.
Harhar et al., "Chemical Characterization and Oxidative Stability of Castor Oil Grown in Morocco", Moroccan Journal of Chemistry, vol. 4, No. 2, Apr. 2016, pp. 279-284.
Hill, (2015) "The When, How and Benefits of Using Thinlays for Pavement Preservation", Equipment World, 9 pages.
Holmbom et al., "Composition of Tall Oil Pitch", Journal of the American Oil Chemist's Society, vol. 55, Feb. 23, 1978, pp. 342-344, Retrieved from the Internet: URL:http:www.springerlink.com/content/j37742625p63ggtl/fulltext.pdf [retrieved on Apr. 24, 2012].

(56) References Cited

OTHER PUBLICATIONS

International Search Report and Written Opinion for International Application No. PCT/US2018/043387, dated Nov. 28, 2018, 17 pages.
International Search Report and Written Opinion for International Application No. PCT/US2018/055443, mailed on Jan. 31, 2019, 14 pages.
International Search Report and Written Opinion for International Application No. PCT/US2020/042202, dated Oct. 15, 2020, 24 pages.
International Search Report and Written Opinion for International Application No. PCT/US2016/037077, dated Apr. 5, 2017, 20 pages.
International Search Report and Written Opinion for International Application No. PCT/US2016/064950, dated Apr. 19, 2017, 12 pages.
International Search Report and Written Opinion for International Application No. PCT/US2016/064961, dated Apr. 5, 2017, 23 pages.
International Search Report and Written Opinion for International Application No. PCT/US2017/045887, dated Dec. 8, 2017, 14 pages.
International Search Report and Written Opinion of International Application No. PCT/US2018/016451, mailed May 8, 2018, 18 pp.
International Search Report and Written Opinion of International Application No. PCT/US2020/042203, mailed Oct. 15, 2020, 27 pp.
International Search Report and Written Opinion of International Application No. PCT/US2022/026310, mailed Jul. 11, 2022, 11 pp.
Jarde, et al. (2007) "Using Sterols to Detect Pig Slurry Contribution to Soil Organic Matter", Water Air Soil Pollut, 178:169-178.
King et al., "Temperature Dependent Imaging of Aged Asphalt Binders using AFM," Petersen Asphalt Research Conference, Jul. 2019, 28 pp.
Kriz et al. (2007) "Glass Transition and Phase Stability in Asphalt Binders", Road Materials and Pavements Design, 30 pages.
Logan, R.L., (Nov. 1979) "Tall Oil Fatty Acids", Journal of American Oil Chemists Society, 56:777A-779A.
Loughrin, et al. (2006) "Free Fatty Acids and Sterols in Swine Manure", Journal of Environmental Science and Health, Part B, 41:31-42.
Martin et al, "The Effects of Recycling Agents on Asphalt Mixtures with High RAS and RAP Binder Ratios (Project N 9-58)", National Cooperative Highway Research Program Transportation Research Board of The National Academics, Mar. 1, 2015, pp. 1-184.
Material Safety Data Sheet T—SYLFAT™ DP8, Arizona Chemical Company LLC, Aug. 8, 2013, 7 pages.
Material Safety Data Sheet, Catalog No. 102886, Revision date: Apr. 26, 2006, Product Name: beta- Sitosterol Practical Grade, 5 pages.
McSweeney et al., "Composition of Crude Tall Oil & Fractionation Products (Chapter 2)" in "Tall Oil and Its Uses-II", Jan. 1, 1987, Pulp Chemicals Association, pp. 12-19.
Mogawer et al. (2012) "Performance characteristics of high rap bio-modified asphalt mixtures", Transportation Research Board 91st Annual Meeting, 16 pages.
Mühlen et al., "Chapter 7—Introduction to Atomic Force Microscopy and its Application to the Study of Lipid Nanoparticles," in Particle and Surface Characterization Methods, ISBN 3887630572, Feb. 1998, pp. 99-127.
Overney et al., "Friction Measurement on Phase-Separated Thin Films with a Modified Atomic Force Microscope", Nature, Nature Publishing Group, United Kingdom, vol. 359, Sep. 10, 1992, pp. 133-135.
Product Data Sheet from MP Biomedicals Website, Catalog No. 102886, beta-Sitosterol, 2015, 1 page.
"Refining and Properties of Asphalt Binders", Asphalt Handbook, 7th Edition, 2007, 2 pages.
Reinke et al. (2017) "Investigation of Sterol Chemistry to Retard the Aging of Asphalt Binders", Transportation Research Record., 2633(1):127-135.
Reinke et al., "Extended Aging of RAS Mixes with Rejuvenator an Update", May 4, 2017, Binder Expert task Group Meeting, retrieved from the Internet: URL:https://www.asphaltpavement.org/PDFs/Engineering_ETGs/Binder201705/12_Reinke&Hanz_UpdateExtendedAgingofRAS.pdf , retrieved on Nov. 23, 2017.
Reinke et al., "Further Investigations Into the Impact of REOB & Paraffinic Oils on the Performance of Bitiminous Mixtures", Binder ETG Meeting, Apr. 9, 2015, pp. 1-92, Fall River, MA, USA, Retrieved from the Internet: URL:http://www.asphaltinstitute.org/wo-content/uploads/2015-April-Binder-ETG-04_Reinke_MTE-REOB-OTHER-PARAFFINIC-OILS-w-notes-w-crack-maps.pdf.
Reinke et al., "Retardation of Binder Aging Using Sterol Chemistry—Focused on Re-Aging Properties of Treated Binder Based on Theological & Compositional Properties for Six Treatments & Four Aging Levels," Petersen Asphalt Research Conference, Jul. 2019, 41 pp.
Rossi, et al. (2017) "Adhesion Promoters in Bituminous Road Materials: A Review", Applied Sciences, 7(524):1-10.
Rowe, "[Delta]Tc—Some Thoughts on the Historical Development," Binder ETG Meeting, Apr. 28, I2016, pp. 1-43, retrieved from the Internet: URL:https://www.asphaltpavement.org/PDFs/Engineering_ETGs/Binder_201604/13Rowe-DTc-Historical_development.pdf [retrieved on Mar. 22, 2017].
Rowe, "Asphalt Modification", 56th Illinois Bituminous Paving Conference, Dec. 15, 2015, pp. 1-42, Champaign, Illinois, USA, Retrieved from the Internet: URL:http://conferences.ict.illnois.edu/bituminousconference/56th_Annual_Presentationsand_Attendees/Rowe.pdf [retrieved on Mar. 20, 2017].
Rubab et al., (2011), "Effects of Engine Oil Residues on Asphalt Cement Quality," Canadian Technical Asphalt Association Conference, 12 pages.
"Safety Data Sheet—SYLVAROAD™ RP 1000 Performance Additive", Arizona Chemical Company LLC, Apr. 7, 2015, 7 pages.
"Safety Data Sheet—Tallex Pitch", Ingevity Holdings SPRL, Jul. 21, 2017, 12 pages.
Sui et al, "New Low-Temperature Performance-Grading Method: Using 4-mm Parallel Plates on a Dynamic Shear Rheometer," Transportation Research Record: Journal of the Transportation Research Board, vol. 2207, Jan. 2011, pp. 43-48.
Sui et al., "New Technique for Measuring Low-Temperature Properties of Asphalt Binders with Small Amounts of Material", Transportation Research Record, Transportation Research Board, Washington, DC, US, vol. 2179, Dec. 1, 2010, pp. 23-28.
Takano et al., "Chemical and Biochemical Analysis Using Scanning Force Microscopy", Chemical Reviews, vol. 99, No. 10, Oct. 1, 1999, pp. 2845-2890.
"Tall Oil Fatty Acid", Ataman Kimya, retrieved on Aug. 10, 2021, 8 pages.
Verleyen et al., "Analysis of Free and Esterified Sterols in Vegetable Oils", Journal of the American Oil Chemists Society (Jaocs), vol. 79, No. 2, Feb. 1, 2002, pp. 117-122.
Verleyen et al., "Influence of the Vegetable Oil Refining Process on Free and Esterified Sterols. J Am Oil Chem Soc", Article in Journal of the American Oil Chemists' Society, Sep. 2002, 7 pages.
Wakefield, Amma (Aug. 15, 2018) "ΔTc: A Parameter to Monitor Asphalt Binder's Kryptonite" Asphalt, 33(2):24-27.
Wang et al., "Study of extraction of phytosterol from masson pine raw tall oil," Journal of Wood Science, vol. 48, No. 6, Dec. 2002, pp. 505-511 (XP002580474).
Wood Chemistry, PSE 406/Chem E 470, Lecture 13, Diterpenes and Triterpenes, Wood Chemistry, 2015. pp. 5.
Yan et al., (2011), "Recovery of Phytosterols from Waste Residue of Soybean Oil Deodorizer Distillate", Soybean—Applications and Technology, 13 pages.
Zaumanis et al. (2014) "Evaluation of Different Recycling Agents for Restoring Aged Asphalt Binder and Performance of 100 % Recycled Asphalt", Materials and Structures, 48(8):2475-2488.
Zaumanis et al., "Evaluation of Rejuvenator's Effectiveness with Conventional Mix Testing for 100% Reclaimed Asphalt Pavement Mixtures," Transportation Research Board of the National Academies, vol. 2370, No. 1, Jan. 2013, pp. 17-25. (XP055526878).
Zaumanis et al., "Influence of six rejuvenators on the performance properties of Reclaimed Asphalt Pavement (RAP) binder and 100%

(56) References Cited

OTHER PUBLICATIONS recycled asphalt mixtures," Construction and Building Materials, vol. 71, Sep. 2014, pp. 538-550. (XP029080483).

Anderson et al., "Evaluation of the Relationship Between Asphalt Binder Properties and Non-Load Related Cracking," Journal of the Association of Asphalt Paving Technologies, vol. 80, 2011, pp. 615-664. (Abstract Only).

Carden et al., "Dietary Plant Sterol Esters Must be Hydrolyzed to Reduce Intestinal Cholesterol Absorption in Hamsters," The Journal of Nutrition Biochemical, Molecular, and Genetic Mechanisms, vol. 145, No. 7, May 2015, pp. 1402-1407.

Carr et al., "Stearate-Enriched Plant Sterol Esters Lower Serum LDL Cholesterol Concentration in Normo- and Hypercholesterolemic Adults," The Journal of Nutrition Biochemical, Molecular and Genetic Mechanisms, vol. 139, No. 8, Jun. 2009, pp. 1445-1450.

"Distilled Tall Oil, Crops—Identification of Petitioned Substance," CAS No. 8002-26-4, Technical Evaluation Report compiled by Savan Group for the USDS National Organic Program, Aug. 12, 2021, 18 pp.

Fernandes et al., "Phytosterols: Applications and recovery methods," Bioresource Technology, vol. 98, No. 12, Nov. 2006, pp. 2335-2350.

Allen, Robert, "Structural Characterization of Micromechanical Properties in Asphalt Using Atomic Force Microscopy," Thesis, Office of Graduate Studies at Texas A&M University for a Master of Science Degree, Dec. 2010, pp. 104.

Alvarez-Henao et al., "Supercritical fluid extraction of phytosterols from sugarcane bagasse: Evaluation of extraction parameters," The Journal of Supercritical Fluids, vol. 179, Oct. 2021, 105427. (8 pp).

Appleton et al., "The Sterol Content of Fungi II. Screening of Representative Yeasts and Molds for Sterol Content," Applied Microbiology Applied Microbiology, vol. 3, No. 4, Mar. 1955, pp. 249-251.

"STEROLS" retrieved from http://www.cyberlipid.org/sterols/ster0003.htm, Nov. 2016, 22 pp.

Weete et al., "Phylogenetic Distribution of Fungal Sterols," PLoS ONE, vol. 5, No. 5, May 2010, e10899, pp. 6.

\* cited by examiner

ASPHALT EMULSION SURFACE TREATMENT CONTAINING STEROL

CROSS REFERENCE TO RELATED APPLICATIONS

This application is a divisional of U.S. patent application Ser. No. 16/757,697, filed Apr. 20, 2020, which claims priority to International Application No. PCT/US2018/055443, filed Oct. 11, 2018, which is a continuation of U.S. patent application Ser. No. 15/886,605, filed Feb. 1, 2018, now U.S. Pat. No. 11,542,668, which claims the benefit of U.S. Provisional Patent Application No. 62/574,867, filed Oct. 20, 2017, wherein the contents of these applications are incorporated herein by reference in their entireties

BACKGROUND

Asphalt pavement is one of the most recycled materials, finding uses when recycled in shoulders of paved surfaces and bridge abutments, as a gravel substitute on unpaved roads, and as a replacement for virgin aggregate and binder in new asphalt pavement. Typically, use of recycled asphalt pavement is limited to sub-surface pavement layers or to controlled amounts in asphalt base and surface layers. Such uses are limited in part because asphalt deteriorates with time, loses its flexibility, becomes oxidized and brittle, and tends to crack, particularly under stress or at low temperatures. These effects are primarily due to aging of the organic components of the asphalt, e.g., the bitumen-containing binder, particularly upon exposure to weather. The aged binder is also highly viscous. Consequently, reclaimed asphalt pavement has different properties than virgin asphalt and must be processed in such fashion that the properties of the aged binder don't impact long term performance.

To reduce or retard the impact of asphalt aging on the long-range performance of mixtures, numerous materials have been investigated. For example, rejuvenators are marketed with a stated goal of reversing the aging that has taken place in recycled raw materials such as reclaimed asphalt pavement (RAP) and/or reclaimed asphalt shingles (RAS). It is unlikely that rejuvenation of asphalt can actually occur and the more likely effect is that these rejuvenating additives may instead serve as softening agents for the virgin binders employed in mixtures containing RAP and/or RAS. In some instances, 10% or more by weight of these softening agents are added to the virgin asphalt binder when such mixtures are produced.

Aging can be assessed by measuring $\Delta Tc$, the difference between the stiffness critical temperature and the creep critical temperature after aging. The use of softening agents can produce a mixture with recovered asphalt binder properties that have acceptable values of $\Delta Tc$ after extended mixture aging, but these acceptable asphalt binder properties after aging come at the cost of producing a mix that can be quite low in stiffness during the pavement's early life.

SUMMARY

Disclosed is a method of using sterol in asphalt compositions and methods that may be used for constructing a topmost portion of the pavement and surface treatments for pavement preservation and maintenance. The disclosed sterol-containing asphalt binder can retard, reduce or otherwise overcome the effects of aging in asphalt so as to preserve or retain some or all of the original properties of the virgin binder or virgin asphalt originally used when laying down the asphalt.

In some embodiments is disclosed a method of road paving comprising:
  providing sterol-containing asphalt binder emulsion, wherein a sterol is added to an asphalt binder from 0.5 to 15 wt. % of the sterol based on the asphalt binder before emulsification;
  combining the asphalt binder emulsion containing sterol with aggregate to form an asphalt paving material;
  applying the asphalt paving material atop an asphalt pavement layer; and
  compacting the applied asphalt paving material to form a road pavement having a sterol-containing topcoat layer.

In some embodiments is disclosed a method for treating an asphalt-containing surface comprising:
  providing a surface treatment comprising sterol-containing asphalt binder emulsion, wherein sterol is added to an asphalt binder from 0.5 to 15 wt. % of the sterol based on the asphalt binder before emulsification; and
  applying the surface treatment to the surface of an existing pavement.

Various embodiments of surface treatments include, but are not limited to, a micro surfacing layer, a slurry seal layer, a chip seal layer, a scrub seal, a wear layer, a cape seal, tack coat, an interlayer, or a fog seal.

DETAILED DESCRIPTION

Figure 1A:
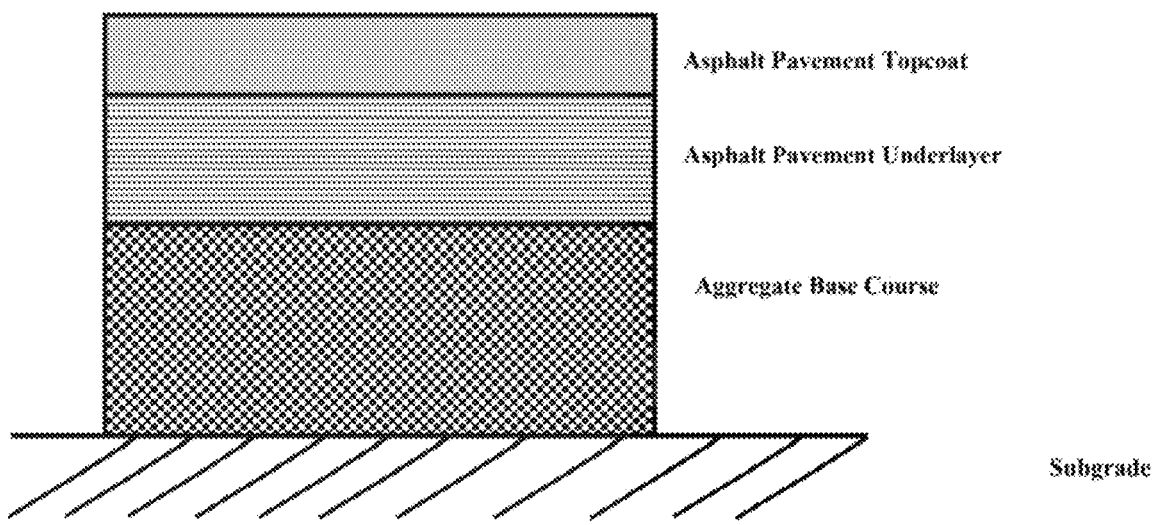
FIG. 1A depicts an asphalt pavement structure.

Disclosed is the use of sterols in compositions and methods that may be used for pavement construction or pavement preservation and maintenance. Applicants have previously shown that sterols can retard, reduce or otherwise overcome some of the effects of asphalt aging so as to preserve or retain some or all of the original properties of virgin asphalt binder. See International Application Nos. PCT/US16/037077, PCT/US16/64950, PCT/US16/064961, PCT/US17/

045887, and PCT/US18/16451 each of which is incorporated herein by reference in its entirety. The sterol was particularly effective when the binders contained reclaimed or recycled materials such as RAP, RAS or combinations of both; or when the binder contained paraffinic additives such as paraffinic base oils or re-refined engine oil bottoms (REOB) which are often used to soften binders.

Headings are provided herein solely for ease of reading and should not be interpreted as limiting.

Abbreviations, Acronyms & Definitions

"Aged" refers to hard, poor-quality, or out-of-specification virgin asphalt or virgin binder, particularly virgin binders having a ring-and-ball softening point greater than 65° C. by EN 1427 and a penetration value at 25° C. by EN 1426 less than or equal to 12 dmm.

"Aggregate" and "construction aggregate" refer to particulate mineral material such as limestone, granite, trap rock, gravel, crushed gravel sand, crushed stone, crushed rock and slag useful in paving and pavement applications.

"Asphalt" refers to a binder and aggregate and optionally other components that are suitable for mixing with aggregate and binder. Depending on local usage, the terms "asphalt mix" or "mix" may be used interchangeably with the term "asphalt."

"Asphalt binder emulsions" refers to asphalt binder particles dispersed in water containing one or more emulsifying agents.

"Binder" refers to a highly viscous liquid or semi-solid form of petroleum. "Binder" can include, for example bitumen. The term "asphalt binder" is used interchangeably with the term "binder" in this application.

"Bitumen" refers to a class of black or dark-colored (solid, semisolid, or viscous) cementitious substances, natural or manufactured, composed principally of high molecular weight hydrocarbons, of which asphalts, tars, pitches, and asphaltenes are typical.

"Crude" when used with respect to a material containing a sterol refers to sterol that has not been fully refined and can contain components in addition to sterol.

"m-critical," "Creep critical," "m-critical temperature," "mcritical temperature," "$Tm_{critical}$," "$T_{mcritical}$" grades or grammatical equivalents thereof refers to the low temperature relaxation grade of a binder. The creep critical temperature is the temperature at which the slope of the flexural creep stiffness versus creep time according to ASTM D6648 has an absolute value of 0.300. The stiffness and creep critical temperatures can also be determined from a 4 mm Dynamic Shear Rheometer (DSR) test or Bending Beam Rheometer (BBR).

"Neat" or "Virgin" binders are binders not yet used in or recycled from asphalt pavement or asphalt shingles, and can include Performance Grade binders.

"Pure" when used with respect to a sterol or mixture of sterols means having at least a technical grade of purity or at least a reagent grade of purity.

"Reclaimed asphalt" and "recycled asphalt" refer to RAP, RAS, and reclaimed binder from old pavements, shingle manufacturing scrap, post-consumer shingle waste, roofing felt, and other asphalt-containing products or applications.

"Reclaimed asphalt pavement" and "RAP" refer to asphalt that has been removed or excavated from a previously used road or pavement or other similar structure, and processed for reuse by any of a variety of well-known methods, including milling, ripping, breaking, crushing, or pulverizing.

"Reclaimed asphalt shingles" and "RAS" refer to shingles from sources including roof tear-off, manufacture's waste asphalt shingles and post-consumer waste.

"S-Critical," "stiffness critical," "SCritical," "$S_{critical}$," "$Ts_{critical}$," "S-critical temperature," grade or grammatical equivalents thereof refers to the low temperature stiffness grade of a binder. The stiffness critical temperature is the temperature at which a binder tested according to ASTM D6648 has a flexural creep stiffness value of 300 MPa or as determined by either the Bending Beam Rheometer test or 4 mm DSR test as described in ΔTc.

"Softening agent" refers to low viscosity additives that ease (or facilitate) the mixing and incorporation of a recycled binder into virgin binder during an asphalt production process.

"Sterol additive" refers to sterols or sterol mixes that can be combined with binder to retard the rate of aging of asphalt or binder, or to restore or renew aged asphalt or aged binder to provide some or all of the original properties of virgin asphalt or virgin binder.

"ΔTc" refers to the value obtained when the low temperature creep or m-value critical temperature is subtracted from the low temperature stiffness critical temperature. The 4 mm dynamic shear rheometer (DSR) test and analysis procedures are described by Sui, C., Farrar, M., Tuminello, W., Turner, T., A New Technique for Measuring low-temperature Properties of Asphalt Binders with Small Amounts of Material, Transportation Research Record: No 1681, TRB 2010. See also Sui, C., Farrar, M. J., Harnsberger, P. M., Tuminello, W. H., Turner, T. F., New Low Temperature Performance Grading Method Using 4 mm Parallel Plates on a Dynamic Shear Rheometer. TRB Preprint CD, 2011, and by Farrar, M., et al, (2012), Thin Film Oxidative Aging and Low Temperature Performance Grading Using Small Plate Dynamic Shear Rheometry: An Alternative to Standard RTFO, PAV and BBr. Eurasphalt & Eurobitume 5th E&E Congress-2012 Istanbul (pp. Paper O5ee-467). Istanbul: Foundation Euraspalt.

"Under layer" and "topcoat" are terms that qualify the asphalt layers and should be understood as relative terms. The further the asphalt layer is from the base course, the more "top" the asphalt layer is considered.

All weights, parts and percentages are based on weight unless otherwise specified.

Figure 1B:
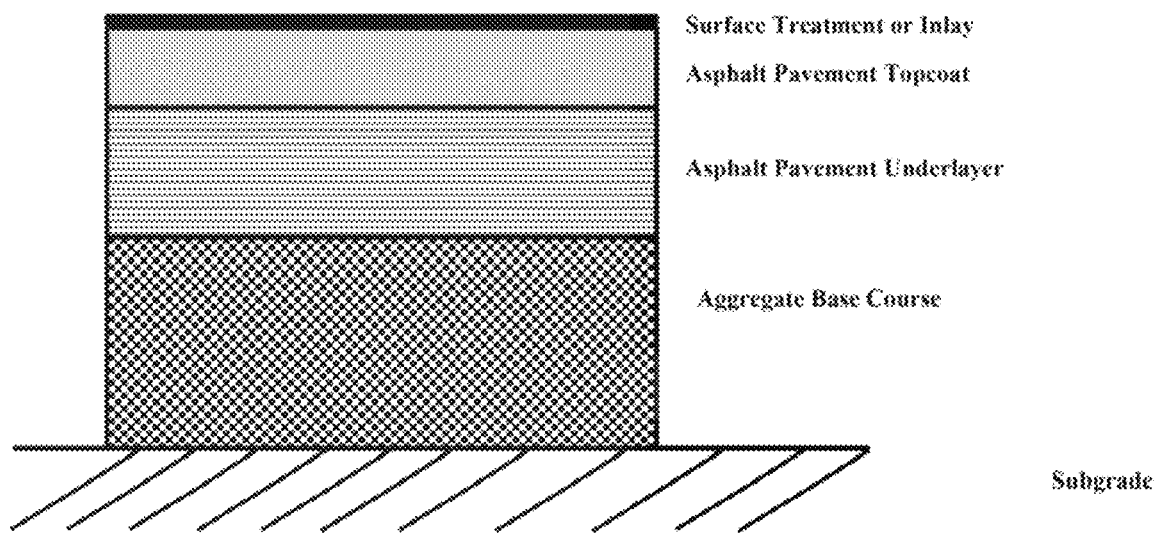
FIG. 1B depicts the asphalt pavement structure of FIG. 1A with a surface treatment.

FIG. 1A is a cross-section of a portion of a typical asphalt pavement. Crushed aggregate is applied as a base course atop a subgrade, which may be soil. The crushed aggregate base course may for example have an average thickness of about 152 mm (6 inches) to about 305 mm (12 inches). Atop the aggregate base course can be applied one or more asphalt layers. FIG. 1B illustrates two asphalt layers, referred to as an asphalt pavement intermediate lift, binder lift, or under layer and an asphalt surface lift, surface layer or pavement topcoat. The asphalt pavement intermediate lift may, for example, have an average thickness of about 57 mm (2.25 inches) to about 127 mm (5 inches); and the asphalt pavement surface lift may, for example, have an average thickness of about 38 mm (1.5 inches) to about 63 mm (2.5 inches). It should be noted that the thickness is also dictated by the aggregate size.

The topmost asphalt layer, "topcoat," is exposed to weather and the elements such as sun, rain, snow, and freezing and thawing. The pavement also experiences frictional wear, fractures and other damage due to vehicular traffic. Over time, these environmental and service factors cause the asphalt pavement, particularly the surface layer, to deteriorate.

Ideally, one would construct the entire pavement, namely from the base course up to the topmost asphalt layer, with sterol-containing asphalt paving materials because over time the asphalt layers age. Aging is not limited to the uppermost portion of the asphalt pavement (e.g., the uppermost 38 mm to 65 mm of compacted pavement). However, the asphalt binder tends to age most severely at the surface, and the degree of aging and consequent detrimental impact on the binder typically decreases with pavement depth, and without regard to the materials that may have been added to the binder or other components of the paving material.

Although a sterol may be added to an entire asphalt pavement, sterols are currently expensive. To control costs, however, the topmost asphalt layer or layers can be paved with sterol-containing asphalt binder paving material. Doing so can retard binder aging throughout the asphalt pavement by making the topcoat layer more resistant to aging and meanwhile protecting the underlying asphalt pavement for an extended time period from weather, elements and other damage caused by premature deterioration of the topcoat layer. For example, by retarding asphalt aging, particularly in the topmost layer or layers, surface cracking that is associated with aged binders can be reduced thereby reducing air movement into the underlying pavement and the associated oxidation. Similarly, by retarding asphalt aging in the topmost layer or layers, moisture uptake in the topcoat layer and moisture transmission through that layer or through cracks in that layer can be reduced, thereby limiting further damage to the pavement and increases in its aging rate. By lengthening the time at which the binder reaches a condition where pavement distress begins the overall pavement life is improved.

When a pavement is to be resurfaced, one might mill away, for example the upper 76 mm (3 inches) to 102 mm (4 inches) of old pavement and replace part or all of the milled portion with a sterol-containing replacement portion. The replacement portion can be applied in many different configurations such that only the topmost 12 mm (0.5 inches) to 19 mm (0.75 inches) or the topmost 12 mm (0.5 inches) to 38 mm (1.5 inches) is applied as a thin overlay that contains a binder with sterol. For example, two 38 mm lifts may be applied with only the topmost 38 mm including a binder with sterol. As another example, the milled out 76 mm (3 inches) or 102 mm (4 inches) can be replaced with two 50 mm (2 inch) lifts or a 50 mm (2 inch) lift with a 25 mm (1 inch) thin overlay (viz., a thin lay), with only the topmost lift or overlay including a binder with sterol.

Other compositions and methods for addressing pavement deterioration include preserving and maintaining an existing pavement with the aid of sterol-containing surface treatments disclosed herein. In such treatments, sterols may be employed as an asphalt blend component in surface treatments for pavement preservation.

Asphalt surface treatment is a broad term embracing several asphalt types and asphalt-aggregate applications that may be used to extend the structural life of the underlying pavement. Such surface treatments usually are less than 25 millimeter (1 in.) thick and may be applied to any kind of road surface. The road surface may for example be a primed granular base, or an existing asphalt or Portland cement concrete pavement surfaced at some point with a bituminous pavement layer. Surface treatments applied to an existing pavement surface are often called seal coats. Surface treatments commonly called chip seals are applied by spraying an asphalt emulsion and immediately spreading and rolling onto the applied emulsion an aggregate cover. A sandwich seal is another surface treatment technique, in which a large aggregate is placed first, an asphalt emulsion (normally polymer modified) is sprayed onto the aggregate, and immediately followed by an application of smaller aggregate on top of the emulsion to lock in the seal. A Cape seal is a single surface treatment followed by a slurry seal or micro-surfacing layer to fill in the voids. These and other surface treatments may be applied multiple times as desired. In some embodiments, a sterol-containing asphalt binder emulsion can be applied as a tack coat and as a fog seal.

Taking into consideration factors such as the region and climate, surface treatments that include sterol-containing asphalt binder may be applied as an emulsion, hot applied bitumen or cutback. In all cases the bitumen used in the surface treatment can contain polymer additives derived from classes such as styrene butadiene rubber (SBR) lattices, styrene butadiene styrene (SBS) block copolymers, reactive ethylene terpolymers (RET), ground tire rubber, acrylic lattices, neoprene lattices, ethylene vinyl acetate (EVA) and polybutene. This list should not be taken as limiting because any polymer that can be incorporated into asphalt in hot, cutback or emulsified form is a candidate. Some surface treatments are based solely on asphalt emulsions as the binder (for example slurry seals and micro-surfacing). Chip seals can be constructed using an emulsion, hot applied asphalt binder, or cutback asphalt. The choice of binder type to use for chip seals is often dictated by the region or climate. The addition of sterol to any of these treatments can favorably impact binder aging in the surface treatment, thus prolonging the useful life of the surface treatment which in turn provides extended protection against aging for pavement beneath the surface treatment.

Whatever pavement construction process is used, the primary ingredients include sterol added to a binder.

Sterol Additive

The disclosed sterol additives preferably can alter (e.g., reduce or retard) an asphalt binder aging rate, or can restore or renew an aged or recycled binder to provide some or all of the properties of a virgin asphalt binder. The disclosed compositions and methods use a class of plant derived chemistry, the sterol class of compounds. While plant sterols do not contain the same number of condensed or partially unsaturated rings as asphaltenes, they do have the benefit of not being a linear or branched linear molecule. For example, a sterol can alter or improve physical and rheological characteristics such as stiffness, effective temperature range, and low temperature properties of an asphalt binder.

In some embodiments, the sterol additive belongs to the class of triterpenoids, and in particular to sterols or stanols. The disclosed sterols (e.g. triterpenoids) can effectively work with asphaltenes. Asphaltenes include extensive condensed ring systems with some level of unsaturation. The asphaltene content of typical binders can range from less than 10% to more than 20%. Asphaltenes are typically described as materials that are insoluble in n-heptane. An exact structure is unknown and based on the performance behavior of different binders it is unlikely that the asphaltene structure in any two binders is the same, especially those from different crude sources. Asphaltenes give a binder its color and stiffness and they increase in content as the binder ages. Consequently, the addition of RAP and/or RAS causes the asphaltene content to increase. Increasing asphaltene content along with other products of oxidation such as carbonyls and sulfoxides are responsible for the stiffening of bituminous mixtures and their ultimate failure. By their very chemical nature asphaltenes are not readily soluble in aliphatic chemicals. Aromatic solvents will readily dissolve asphaltenes and aromatic process oils have been used in recycled mixtures. However, these oils may contain polynuclear aromatic compounds including listed potential carcinogens and therefore are not desirable additives. Most plant based oils are straight or branched chain hydrocarbons with some level of unsaturation and therefore are not as effective at retarding aging as they are at softening the overall binders in a mixture.

Triterpenoids are a major group of plant natural products that include sterols, triterpene saponins, and related structures. Triterpenoids can be natural or synthetic. Typically they are obtained by extraction from plant material. Extraction processes for the isolation of triterpenoids are described e.g. in the international applications WO 2001/72315 A1 and WO 2004/016336 A1, the disclosures of which are each incorporated herein by reference in their entirety.

The triterpenoids include plant sterols and plant stanols. The disclosed triterpenoids include the esterified and non-esterified forms of any of the plant sterols mentioned herein.

Exemplary pure plant sterols include campesterol, stigasterol, stigmasterol, β-sitosterol, Δ5-avenosterol, Δ7-stigasterol, Δ7-avenosterol, brassicasterol or mixtures thereof. In some embodiments, the sterol blend contains β-sitosterol as the pure sterol. In other embodiments, the sterol blend contains a mixture of pure sterols. Commercially available pure sterols and mixtures of pure sterols include those available from MP Biomedicals (Catalog No. 02102886) referred to as beta-Sitosterol (beta-Sitosterol ~40-60%; campesterol ~20-40%; Stigmasterol-5%). In some embodiments, the pure sterol can include pure cholesterol. Cholesterol is shown here to have similar effects as plant sterols.

In some embodiments, a pure sterol can have at least 70 wt. % sterols, and in some embodiments can have at least 80 wt %, at least 85 wt % or at least 95 wt % sterols.

Exemplary crude plant sterols include modified or unmodified natural products containing significant quantities of sterols, including such diverse plant sources as corn oil, wheat germ oil, sarsaparilla root, soybean pitch and corn oil pitch. For example, tall oil pitch can be obtained indirectly from the process of preparing paper from wood, particularly pine wood. For example, tall oil is a product of the Kraft process of wood pulping, of which tall oil pitch is a by-product of the distillation of tall oil. Tall oil pitch is an extremely complex material that can contain rosins, fatty acids, oxidation products and esterified materials, an appreciable fraction of which are sterol esters. Plant sources of crude sterols are inexpensive in that they are the foots or tailings left from various manufacturing processes.

In some embodiments, the crude sterol sources include stigmasterol, β-sitosterol, campesterol, ergosterol, brassicasterol, cholesterol and lanosterol or mixtures thereof. In some embodiments, the crude sterol sources include soy bean oil, corn oil, rice bran oil, peanut oil, sunflower seed oil, safflower oil, cottonseed oil, rapeseed oil, coffee seed oil, wheat germ oil, tall oil, and wool grease. In some embodiments the crude sterol includes a bio-derived source or partially distilled residue of the bio-derived source. In some embodiments, the crude sterol source includes tall oil pitch, soybean oil or corn oil.

Any of the oil tailings or pitches from the disclosed plant sources are suitable crude sterol sources. U.S. Pat. No. 2,715,638, Aug. 16, 1955, to Albrecht, discloses a process for recovering sterols from tall oil pitch whereby the fatty acid impurities are removed by a neutralization process. Following this, the sterol esters are saponified; the free sterols are then recovered and washed with isopropanol and dried.

The crude sterols preferably are obtained from plant sources. The crude sterol can include components in addition to the desired sterol or sterols. Exemplary plant sources for crude sterols include tall oil pitch, crude tall oil, sugar cane oil, hot well skimmings, cottonseed pitch, soybean cane oil, corn oil pitch, wheat germ oil or rye germ oil. In some embodiments, tall oil pitch is a source of the crude sterol. Tall oil pitch can include about 30 to 40% unsaponifiable molecules. Unsaponifiables are molecules that do not react with alkali hydroxides. Fatty and rosin acids remaining in the tall oil pitch readily react with potassium or sodium hydroxides and thus the unsaponifiables can be readily separated. It has been shown that 45% of the unsaponifiable fraction can include sitosterols. Therefore, a tall oil pitch sample can contain approximately 13.5% to 18% sterol molecules by weight. In some embodiments the crude sterol can have less than a food grade of purity (e.g., less than 85 wt. % sterols) or contain more than 85 wt. % sterols but also can contain impurities or contaminants that render the material unsuitable for use in foods.

In some embodiments, the crude sterol may be animal derived such cholesterol.

It should be understood that the disclosed sterol can be used in any combination that includes animal derived, plant derived, pure or crude. For example, in some embodiments the sterol is pure sterol from plants. In some embodiments, the sterol is pure sterol that is a combination of plant derived and animal derived. In some embodiments, the sterol is crude sterol from a combination of plant derived and animal derived.

The sterol added to the asphalt binder may for example range from about 0.5 to about 15 wt. %, from about 1 to about 10 wt. %, or from about 1 to about 3 wt. % of the binder in an asphalt. In some embodiments, the sterol added to the asphalt binder may for example range from about 0.5 to about 15 wt. %, from about 1 to about 10 wt. %, or from about 1 to about 3 wt. % of a virgin binder in an asphalt.

In some embodiments, sterol can alter, reduce or retard the degradation of rheological properties in binders containing recycled bituminous materials that include softening agents such as RAS, RAP, REOB, virgin paraffin or naphthenic base oils, untreated or non-rerefined waste drain oils or waste engine oil materials, vacuum tower asphalt extenders, paraffinic or naphthenic processing oils or lubricating base oils.

Binders

The binders used can include any binder known in the art and from any region, naturally occurring or manufactured. Asphalt-based binders include petroleum-based binders. Suitable asphalt-based or asphalt binders include those binders complying with ASTM D-6373, D-3387, D-946, AASHTO M320, M332, M226, or M20.

Some asphalt paving can include recycled materials such as RAP and RAS as components in the asphalt being paved. Typically RAP concentrations can be as high as 50% and RAS concentrations can be as high as 6% by weight of the paving material. It is not uncommon is some locales for RAP and RAS to be used together. The typical binder content of RAP is in the range of 4-6% by weight and the typical binder content of RAS is in the range of 20-25% by weight. For a bituminous mixture requiring 5.5% total binder produced utilizing 30% RAP and 6% RAS, the recycled binder replacement breaks down as follows: In the case of this mixture the 30% RAP would contribute 1.5% binder (assuming the RAP contained 5% binder) and the 6% RAS would contribute 1.3% binder (assuming the RAS contained 22% binder). For this mix the recycled binder contributes approximately 51% of the binder in the mix ((1.5%+1.3%)/5.5%). This is expressed in the terms generally used in mix designs as a binder replacement ratio of 0.51. The typical binder content of RAP is in the range of 4-6% by weight and the typical binder content of RAS is in the range of 20-25% by weight. Consequently, a mixture containing 50% by weight of RAP will contain 2.5% to 3% RAP binder contributed to the final binder mixture and a binder mixture containing 6% RAS by weight will contain 1.2% to 1.5% RAS binder contributed to the final binder mixture.

The disclosed binders containing sterol can provide recycled asphalt (e.g. RAP or RAS) having improved physical and rheological characteristics such as reduced stiffness, more effective temperature range, and desirable low temperature properties.

Other Additives

The asphalt may contain other components in addition to the disclosed sterol-containing asphalt binder. Such other components can include elastomers, non-bituminous binders, adhesion promoters, softening agents, rejuvenating agents and other suitable components.

Useful elastomers include, for example, ethylene-vinyl acetate copolymers, polybutadienes, ethylene-propylene copolymers, ethylene-propylene-diene terpolymers, reactive ethylene terpolymers (e.g. ELVALOY™), butadiene-styrene block copolymers, styrene-butadiene-styrene (SBS) block terpolymers, isoprene-styrene block copolymers and styrene-isoprene-styrene (SIS) block terpolymers, chloroprene polymers (e.g., neoprenes) and the like. Cured elastomer additives may include ground tire rubber materials. For example, see the 2015 Standard Specifications for the State of California (Section 37, pg. 423), and Section 39 for Hot Mix Asphalt, starting on pg. 447 and available at http://www.dot.ca.gov/dist1/d1lab/SECTION%2039%20%20HMA.pdf and http://caltrans-opac.ca.gov/publicat.htm.

The asphalt binder may be prepared by mixing or blending sterol with binder (e.g. virgin binder) to form a mixture or blend. In some embodiments, the mixture or blend can be added to recycled asphalt materials (e.g. RAS and/or RAP) and aggregate. One of skill in the art will recognize that any sequences of adding and mixing components are possible. In some embodiments, a method of preparing an asphalt mix involves mixing or blending a sterol with virgin asphalt at a temperature from about 100° C. to about 250° C. or from about 130° C. to about 200° C. In some embodiments, the sterol is mixed with the virgin asphalt at a temperature from about 125° C. to about 175° C., or 180° C. to 205° C. In some embodiments, the virgin asphalt is combined with sterol and softening agent. In still other embodiments, the virgin binder is combined and mixed with sterol and aggregate to form an asphalt pavement material. In other embodiments, the virgin binder is combined and mixed with binder extracted from RAP, RAS or a combination of RAP and RAS, sterol and aggregate to form an asphalt pavement material.

A mixture of a suitable aggregate comprising stones, gravel, sand, and the like, is heated at an elevated temperature of about 132-187° C. and mixed with a similarly hot, asphalt binder containing sterol until the aggregate particles are coated with the binder. Paving materials made in this temperature range are often referred to as a hot mix. The mixture of asphalt and aggregate is then applied by a paving machine to a surface which is usually roller compacted by additional equipment while still at an elevated temperature. The compacted aggregate and asphalt binder eventually stiffens upon cooling to form a pavement.

The disclosed sterol-containing asphalt binder can be applied to the topmost asphalt layers of a road pavement by to other process such as cold-mix process where the aggregate, cold and moist, is mixed with a hot or cold binder, which can be an emulsion of asphalt dispersed in water using a suitable surfactant or a mixture of asphalt and a suitable hydrocarbon solvent, such as naphtha, #1 oil, or #2 oil, to name a few (generally referred to as a cutback asphalt). The emulsified asphalt particles coat and bind with the aggregate and remain after the water has evaporated. When a cutback asphalt is used, the hydrocarbon solvent evaporates at different rates depending on the volatility of the solvent. Regardless of the solvent volatility, what remains behind is a paving material where the asphalt component gradually hardens or stiffens over time as the solvent is removed.

The binder can also be foamed and mixed with the aggregate to enhance the coating efficacy. Some emulsions also utilize hydrocarbon solvents in addition to water to produce materials suitable for specific applications. Warm mix processes may also be used to form a pavement in which the topmost asphalt layer of the pavement includes a sterol-containing asphalt binder.

In one embodiment a method of making a road pavement is disclosed such that, a sterol-containing asphalt binder is provided wherein a sterol is added to a virgin asphalt binder from 0.5 to 15 wt. % of the sterol based on the virgin asphalt binder; combining the asphalt binder containing sterol with aggregate to form an asphalt paving material; applying the asphalt paving material atop an asphalt pavement layer; and compacting the applied asphalt paving material to form a road pavement. In some embodiments, the asphalt paving material can be compacted to form a road pavement to a suitable density, typically 89% or greater of maximum theoretical density depending on aggregate gradation and position within the pavement layer to form a road pavement.

In some embodiments, the binder includes a blend of binders. In some embodiments, the binder blend includes virgin binder and binder extracted from reclaimed asphalt. For example, the binder extracted from RAS material may be extracted from manufacturer asphalt shingle waste, from post-consumer asphalt shingle waste, or from a mixture of binders extracted from manufacturer and post-consumer asphalt shingle waste. In some embodiments, a binder blend may include from about 60 wt % to about 95 wt % of virgin binder and sterol from about 0.5 wt % to about 15.0 wt % of the virgin asphalt. In some embodiments, a binder blend may further include 5 wt % to about 40 wt % of binder extracted from reclaimed asphalt such as RAP, or RAS or a combination of RAP and RAS. The sterol additive has been shown in to improve high and low temperature properties and PG grading for both low and high temperature ends of RAP- or RAS-containing asphalt binder blends.

The asphalt pavement material can be applied as the topmost layer of a road pavement, with the topmost layer having an average thickness of for example up to about 38 mm or up to about 65 mm. In some embodiments, the asphalt pavement material is applied as the topmost layer of the road pavement, with the topmost layer having an average thickness of for example up to about 12 mm or up to about 38 mm.

Emulsions

While pavement construction can use asphalt in emulsions, emulsions are typically used to apply asphalt surface treatments. Typical emulsions include aqueous emulsions with the asphalt binder particles dispersed in water containing one or more emulsifying agents.

The emulsifying agents used in the emulsion can include any known cationic, anionic, nonionic, or amphoteric surfactants. In paving applications, asphalt emulsions are classified in ASTM D977 and D2397 by the time it takes for "set" or "cure": rapid or quick setting (RS/QS), medium setting (MS) or slow setting (SS). Emulsions cure through evaporation of the water. Some emulsions (e.g., cationic emulsions) also cure through electrochemical deposition of the dispersed asphalt particles on the surface of the aggregate. This is a process of coalescence as the asphalt particles migrate to the aggregate surface and then the asphalt particles join together or coalesce to form a uniform asphalt layer. This can be considered a chemical "break". In any event, before an emulsion can cure or set, the emulsion typically breaks via separation of water from the asphalt particles. The breaking time is determined by the emulsion stability, and the more stable the emulsion, the longer the breaking time. Emulsifying agents can also be classified based on their surface charge (or lack thereof) as cationic, anionic, nonionic, or amphoteric. By combining the surface charge characteristic with the setting time, emulsifiers used for paving applications can be classified as, for example, cationic emulsions under ASTM D2397 as cationic quick setting (CQS), cationic rapid setting (CRS), cationic medium setting (CMS), and cationic slow setting (CSS). Anionic and other non-cationic emulsions are specified under ASTM D977 as slow setting (SS), quick setting (QS), medium setting (MS) and rapid setting (RS). These classifications are known in the art and can be readily obtained. See, for example, ASTM D977 and D2397 in Volume D4.03 under Road and Paving Materials.

The asphalt emulsions can contain other agents such as polymers, solvents and other additives as described herein.

The disclosed surface treatments are aqueous emulsions that include sterol-containing asphalt binder. The binder may be formed by mixing a sterol into an asphalt binder (e.g. virgin binder). The binder containing sterol is then dispersed in a continuous water phase with the help of an emulsifying agent. The emulsifying agent and preheated asphalt are typically pumped into a colloid mill where high shear dispersion produces an asphalt emulsion having asphalt droplets dispersed in the water.

In micro-surfacing formulations and optionally for slurry seal operations, the asphalt emulsions are polymer modified, e.g., to increase the strength and durability of the resulting asphalt-based, cold paving formulations and to decrease the curing times of these formulations.

Suitable polymer lattices for microsurfacing surface layer formulations include cationic SBR (styrene-butadiene rubber) lattices, natural rubber lattices, and polychloroprene lattices (e.g. NEOPRENE™ lattices available from Denka). SBS (poly(styrene-butadiene-styrene)) block copolymers and ethylene, ethylene vinyl acetate (EVA), glycidyl methacrylate terpolymers or ethylene, n-butyl acrylate (nBA), glycidyl methacrylate terpolymers can also be used but typically must be added slowly to heated asphalt (e.g. 160-170° C.), and for some polymer grades subjected to high shear mixing to disperse the polymer into the asphalt binder prior to forming the asphalt emulsion. Preferred ethylene, EVA or nBA, glycidyl methacrylate terpolymers include ELVALOY™ terpolymers available from E. I. DuPont de Nemours.

The sterol-containing emulsion preferably includes between about 0.1 wt % and about 10 wt surfactants, 55 wt % to 75 wt % of a sterol-containing asphalt binder with water making up the total. Prior to application of the emulsion, the surface to be treated is usually cleaned to remove excess surface dirt, weeds, and contaminants by, for example, brushing the surface, blasting the surface with compressed air, or washing the surface.

The emulsion can be applied using any suitable method for applying a liquid to a porous surface, such as brushing, wiping and drawing, or spraying. Spraying is a preferred emulsion application method because a thin emulsion layer can be applied in a short time period. The emulsion is preferably applied at a temperature between 10 (15° F.) to 93° C. (200° F.) or between 15° C. (60° F.) and 87° C. (190° F.). The emulsion desirably has a viscosity at the application temperature that allows it to be sprayed upon the surface and the preferred viscosity range in centipoise would be about 10-70 cP as determined using ASTM D7226, "Determining the Viscosity of Emulsified Asphalts Using a Rotational Paddle Viscometer".

Cold-In-Place Recycling

The disclosed sterol-containing asphalt binder can also be used in any cold-in-place recycling (CIR) process known in the art. CIR involves the removal, reprocessing and relaying of part of an existing asphalt surface without the use of heat. CIR processes can be economical because they reduce costs from, for example, reusing existing material, minimizing use of new materials, decreasing material transportation and hauling demands and not heating the material. CIR can include the removal of the top inches of an existing asphalt pavement. CIR can be used, among other things, to create a new pavement layer using the old pavement, remove cracks, ruts and potholes and rehabilitate a pavement surface. In some embodiments, the top 1 inch or more to the top 6 inches or less can be removed. Removal for CIR is generally performed by milling or grinding. Milling desirably is performed using a milling machine or using machines referred as reclaimers.

CIR as the name implies is performed on the grade in a continuous process. The removed material is generally passed through a crusher which is component part of the CIR paving train. The reclaimed material is crushed and/excessively large particles are rejected so as to yield an acceptable gradation prior to being mixed with emulsion or foamed asphalt. A desired gradation can specify a maximum particle size only. One example of a gradation is the removed material is less than 1¼ inch nominal size. Another example is the removed material is less than 1 inch. in nominal size. Virgin aggregate can be added to the removed material if needed.

The material can then be mixed with an asphalt emulsion having a sterol-containing asphalt binder. In some embodiments lime, Portland cement or fly ash is added if the recycled aggregate material requires additional fines. If the CIR mix is too high in moisture content the addition of fines can also absorb the excess moisture. The mixing can be performed by any machine known in the art including, but not limited to, a milling machine, a reclaimer or a pug mill. The material can then be returned to the milled surface and paved or graded to the specified thickness and width.

Examples of machines that can be used for these steps are asphalt pavers and motor graders.

Cut Backs

In some embodiments, sterol-containing asphalt binder is diluted or "cut" with solvents as part of a complex composition or network, which may further include functional additives such as polymers and surfactants as well as inert additives such as filler clays and cellulose fibers. These additives are included in cutback formulations to provide compositions with specific functional properties such as viscosity, elasticity adhesion and cure rate.

Cutbacks are used because their viscosity is lower than that of neat asphalt and can thus be used in low temperature applications. After a cutback is applied, the solvent evaporates away and only the asphalt is left. A cutback asphalt is said to "cure" as the petroleum solvent evaporates away.

Exemplary cutback solvents include petroleum solvents, Light Cycle Oil (LCO) and #2 Diesel Fuel, #1 oil, or #2 oil, to name a few.

The types of cutback asphalts are defined by American Society of Testing and Materials (ASTM) specifications as follows:
SC=Slow cure type (Road Oils): ASTM D-2026-72
MC=Medium cure type: ASTM D-2027-76

The cutback may for example contain from 50 to 96 wt % asphalt binder, 70 to 90 wt % asphalt binder, or 75 to 85% asphalt binder, with the remainder being cutback solvent. In addition, the cutback asphalt may contain conventional amounts of antistrip or other additives.

Interlayers

Figure 1C:
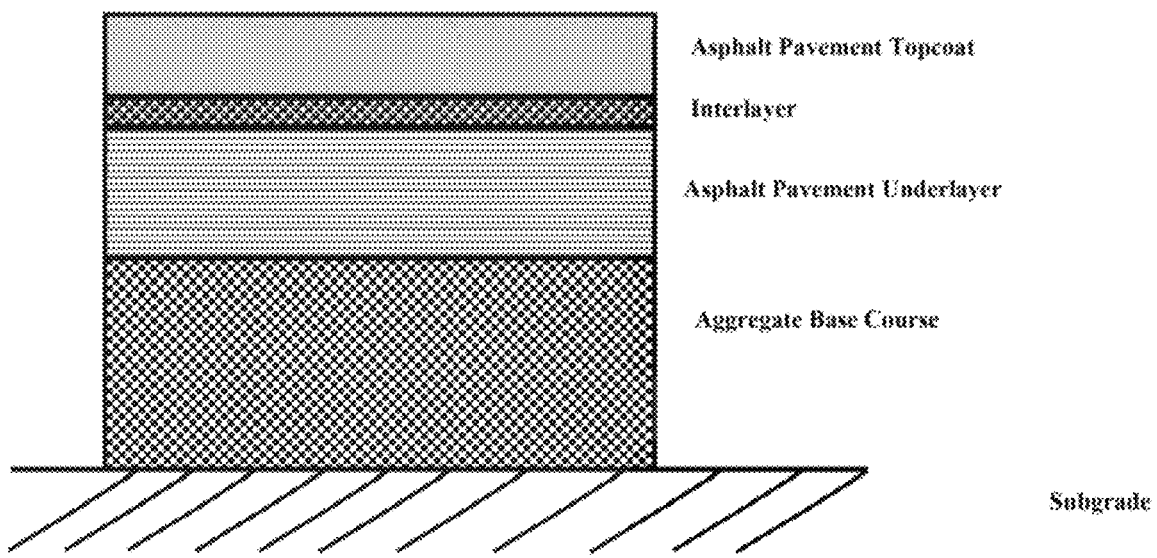
FIG. 1C depicts the asphalt pavement with an interlayer.
Figure 2:
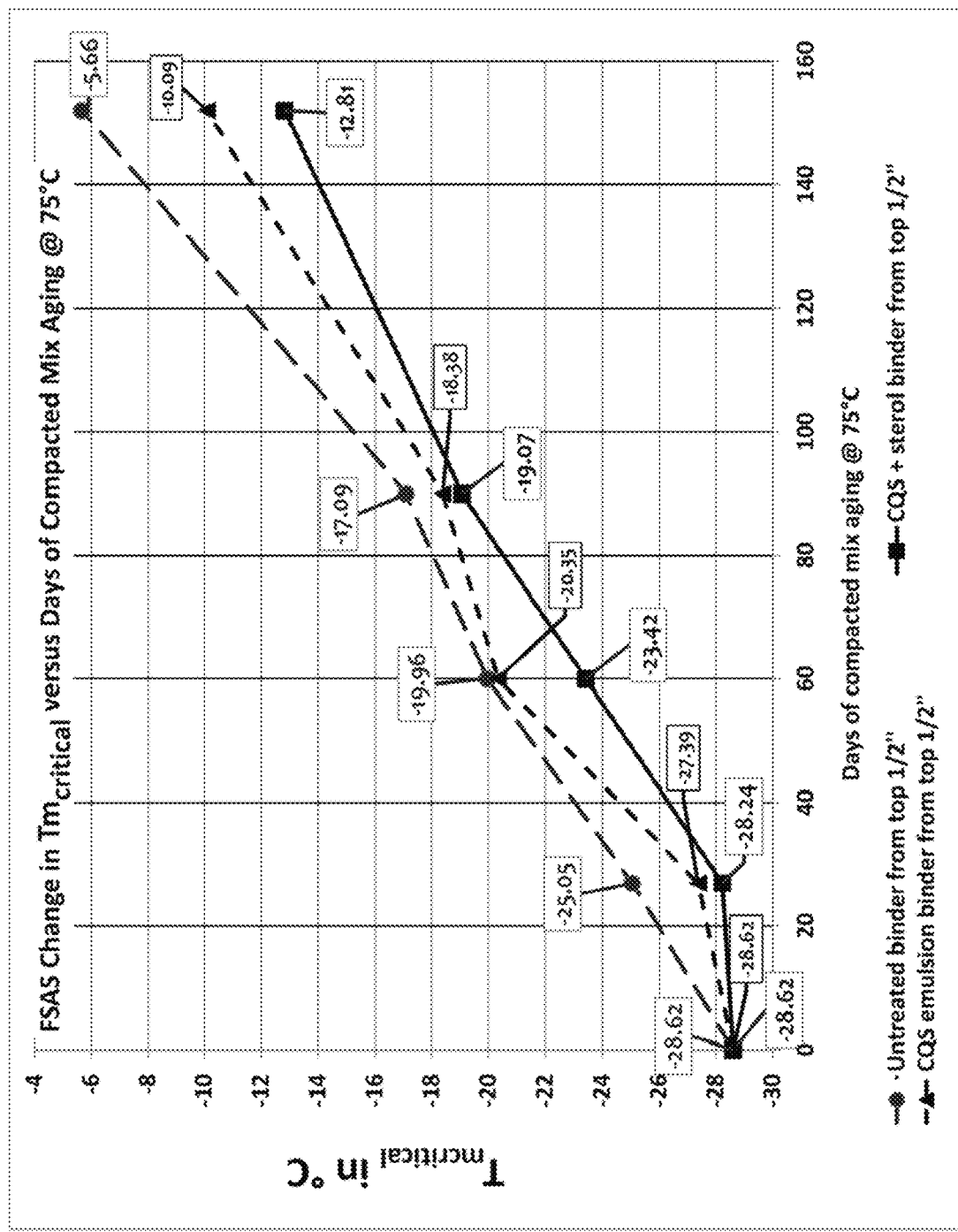
FIG. 2 graphically depicts m-critical compared to days of oven aging at 75° C.

The disclosed sterol-containing asphalt binder can also be used an interlayer. FIG. 1C illustrates interlayers as layers that maybe placed between an old asphalt pavement and a newly applied asphalt layer. Interlayers are typically an asphalt mix with a high binder amount.

In one exemplary embodiment an interlayer mix contains 6% to 12% polymer modified binder and 88% to 94% crushed aggregate. The binder is produced by modifying a blend of virgin binder and 0.5% to 15% sterol with an elastomer. Examples of materials requirements can be found at the Iowa DOT specification SS-15006, "Supplemental Specifications for Hot Mix Asphalt Interlayer." In some embodiments, the asphalt binder (polymer modified or not) contains the disclosed sterol.

In embodiments, the surface treatment can be a mixture of fine aggregate and asphalt binder containing sterol, a mixture of fine aggregate and emulsion where the asphalt base in the emulsion contains sterol, a pavement preservation procedure where the emulsion containing the sterol is sprayed on the existing pavement prior to application of aggregate in the form of chips or an aggregate mixture, a pavement preservation procedure where a slurry seal or microsurfacing emulsion wherein the emulsion containing the sterol is mixed with the slurry seal or microsurfacing aggregate at the time the slurry seal or microsurfacing is applied to the pavement, or a spray application of an emulsion where the emulsion containing sterol is applied directly to the pavement and allowed to cure prior to the application of normal traffic.

Non-limiting embodiments also include:
1. A method of road paving comprising:
   providing sterol-containing asphalt binder, wherein sterol is added to an asphalt binder from 0.5 to 15 wt. % of the sterol based on the asphalt binder;
   combining the sterol-containing asphalt binder with aggregate to form an asphalt paving material;
   applying the asphalt paving material atop an asphalt pavement layer; and
   compacting the applied asphalt paving material to form a road pavement having a sterol-containing topcoat layer.
2. The method of embodiment 1, wherein the asphalt pavement material is applied to the topmost layer of the road pavement as a thinlay comprising up to about 12 mm (0.5 inches) to about 38 mm (1.5 inches).
3. The method of embodiment 1, wherein the pavement material is applied to the topmost layer of the road pavement as a thinlay comprising up to about 12 mm (0.5 inches) to about 19 (0.75 inches) mm.
4. The method as in any one of embodiments 1-3, wherein the sterol is 1 to 10 wt. % of the asphalt binder weight.
5. The method as in any one of embodiments 1-3, wherein the sterol is 1 to 3 wt. % of the asphalt binder weight.
6. The method as in any one of embodiments 1-5, wherein the sterol comprises a pure sterol.
7. The method of embodiment 6, wherein the pure sterol comprises cholesterol.
8. The method of embodiment 6, wherein the pure sterol comprises a blend of plant sterol and cholesterol.
9. The method as in any one of embodiments 1-5, wherein the sterol comprises a crude sterol.
10. The method of embodiment 9, wherein the crude sterol comprises cholesterol.
11. The method of embodiment 9, wherein the crude sterol is obtained from a bio-derived source or distilled residue of the bio-derived source.
12. The method of embodiment 9, wherein the crude sterol comprises a tall oil pitch.
13. The method of embodiment 9, wherein the crude sterol comprises crude sterol derived from soybean oil.
14. The method of embodiment 9, wherein the crude sterol comprises corn oil.
15. The method as in any one of embodiments 1-14, further comprising adding reclaimed asphalt binder from recycled asphalt pavement (RAP), recycled asphalt shingles (RAS) or combination of both RAP and RAS.
16. The method as in any one of embodiments 1-15, wherein the RAP, RAS or combination of both RAP and RAS contain softening agents.
17. The method of embodiment 16, wherein the softening agents are REOB, virgin paraffin or naphthenic base oils, untreated or non-rerefined waste drain oils or waste engine oil materials, vacuum tower asphalt extenders, paraffinic or naphthenic processing oils or lubricating base oils, or bio-derived oils.
18. The method as in any one of embodiments 1-17, wherein the sterol-containing asphalt binder provides a ΔTc of greater than or equal to −5.0° C.
19. A road pavement made from the method as in any one of embodiments 1-18.
20. A method for treating an asphalt-containing surface comprising:
   providing a surface treatment comprising sterol-containing asphalt binder, wherein sterol is added to an asphalt binder from 0.5 to 15 wt. % of the sterol based on the asphalt binder; and
   applying the surface treatment to the surface of an existing pavement.
21. The method of embodiment 20, wherein the surface treatment is provided as an emulsion.
22. The method of embodiment 20, wherein the surface treatment is a micro surfacing layer.
23. The method of embodiment 20, wherein the surface treatment is a slurry seal layer.
24. The method of embodiment 20, wherein the surface treatment is a chip seal layer.

25. The method of embodiment 20, wherein the surface treatment is applied as a wear layer, a cape seal, tack coat or an interlayer.
26. The method of embodiment 20, wherein the surface treatment is applied as a fog seal.
27. The method of embodiment 20, wherein the sterol-containing asphalt binder is a cutback asphalt.
28. The method as in any one of embodiments 20-27, wherein the sterol is 1 to 10 wt. % of the asphalt binder weight.
29. The method as in any one of embodiments 20-27, wherein the sterol is 1 to 3 wt. % of the asphalt binder weight.
30. The method as in any one of embodiments 20-29, wherein the sterol comprises a pure sterol.
31. The method of embodiment 30, wherein the pure sterol comprises cholesterol.
32. The method of embodiment 30, wherein the pure sterol comprises a blend of plant sterol and cholesterol.
33. The method as in any one of embodiments 20-29, wherein the sterol comprises a crude sterol.
34. The method of embodiment 33, wherein the crude sterol comprises cholesterol.
35. The method of embodiment 33, wherein the crude sterol is obtained from a bio-derived source or distilled residue of the bio-derived source.
36. The method of embodiment 33, wherein the crude sterol source comprises a tall oil pitch.
37. The method of embodiment 33, wherein the crude sterol source comprises crude sterol derived from soybean oil.
38. The method of embodiment 33, wherein the crude sterol source comprises corn oil.
39. The method as in any one of embodiments 20-38, wherein the sterol comprises a sterol blend of 10:90 to 90:10 of pure sterol: crude sterol.
40. The method as in any one of embodiments 20-39, further comprising adding reembodimented asphalt binder from recycled asphalt pavement (RAP), recycled asphalt shingles (RAS) or combination of both RAP and RAS.
41. The method as in any one of embodiments 20-40, wherein the RAP, RAS or combination of both RAP and RAS contain softening agents.
42. The method of embodiment 41, wherein the softening agents are REOB, virgin paraffin or naphthenic base oils, untreated or non-rerefined waste drain oils or waste engine oil materials, vacuum tower asphalt extenders, paraffinic or naphthenic processing oils or lubricating base oils, or bio-derived oils.
43. The method as in any one of embodiments 20-42, wherein the asphalt binder provides a ΔTc of greater than or equal to −5.0° C.
44. A road pavement made as in any one of embodiments 20-44

EXAMPLES

The following study showed that the presence of sterol in a base asphalt binder used to produce an emulsion retards the aging of the binder in the top ½ inch of mix in compacted specimens relative to the untreated and only compacted specimens.

Specimens of bituminous mixtures used were Wisconsin specification 3 million Equivalent Single Axel Load (ESAL) mixture containing Reclaimed Asphalt Pavement (RAP) yielding a 0.2 binder replacement ratio using (4.5% by weight) virgin PG 58S-28 asphalt binder for a total binder content of 5.6%. These bituminous mixtures were compacted to a target air voids level of 6% to 8% using two gyratory compactors referenced by the prefix T and P. The gyratory compactors referenced T were manufactured by Troxler Electronic Laboratories, Inc. of Research Triangle Park, North Carolina. The gyratory compactors referenced P were manufactured by Pine Instrument Company of Grove City, Pennsylvania.

All specimens were compacted to a height of 95 mm and a diameter of 150 mm. All specimens were inserted into sleeves of approximately 97 mm in height cut from 6 inch internal diameter sewer pipe with a nominal ⅛ inch wall thickness. The tops and bottoms of the specimens remained exposed. The compacted specimens were separated into three groups, each group having 20 specimens (10 T and 10 P). Group I of twenty specimens received no treatment and was oven aged or naturally aged. Group II of twenty specimens was treated with the equivalent of 0.2 gallons/yd$^2$ of a cationic quick set (CQS) emulsion produced from a PG 64S-22 base binder. Group III of twenty specimens was treated with the equivalent of 0.2 gallons/yd$^2$ of a cationic quick set (CQS) emulsion produced from a PG 64S-22 to which 5% phytosterol had been added prior to emulsification. The percent residue of the CQS emulsion was in each case between 65% and 66%. A foam brush was used to apply the emulsion by weight to the tops of the gyratory specimens that had been inserted into the sewer pipe. The tops of the gyratory specimens were the tops of the compacted specimens as removed from the gyratory molds. The air voids of all specimens were determined using AASHTO T-166 and recorded for the unique alpha numerical identifier assigned to each specimen. The outside of the sewer pipe containing each specimen was labeled as "untreated", "CQS", or "CQS+sterol" as well as being labeled with a T or P followed by the unique numerical identifier assigned to that particular specimen.

The three groups of twenty specimens per group were further separated into three groups of ten specimens. Each sub group of ten specimens contained 10 untreated specimens, 10 CQS treated specimens and 10 CQS+sterol treated specimens and each group of 10 specimens contained five T and five P specimens. One subgroup of thirty specimens was placed in a forced draft oven held at 75° C. for aging and the other subgroup of thirty specimens was placed out in the open to be aged naturally. The oven conditioned samples were removed from the oven after 27, 60, 90, and 152 days of conditioning at 75° C.

Accelerating aging by oven conditioning the samples stimulates as much as possible the real world conditions of pavements. In the real world conditions, temperature of a pavement layer decreases with increasing depth from the surface. By encasing the test samples in PVC sleeves, this would prevent oxygen from moving through the sidewalls of the samples and thereby stimulate a real world condition for pavements.

Tables 1 through 5 summarize the data obtained by testing binder samples recovered from top ½ inch layer of the compacted mixture specimens for the untreated, CQS emulsion, and CQS emulsion produced from asphalt containing 5% of plant sterols.

Table 1 is the base or control data for all the treatments. Table 1 data was recovered from a compacted mix specimen, which received no treatment and had not been aged.

TABLE 1

Properties of Recovered Binder with no Treatment and no Aging

Properties Of Recovered Binder From Sample With No Aging

| Sample ID | Description | PG Grade @ 1.0 kPa, °C. | PG Grade @ 2.2 kPa, °C. | S-critical Temp, °C. | m-critical Temp, °C. | ΔTc, °C. | R-Value |
|---|---|---|---|---|---|---|---|
| Control | control, Top 0.5", T-30, P-15, Rec AC, 4 mm, HR3-4 no aging | 87.1 | 80.5 | −29.74 | −28.62 | −1.13 | 2.621 |

The data in Tables 2 through 5 summarize the recovered binder data after 27, 60, 90, and 152 days of aging at 75° C. in a forced draft oven. The data in Table 6 summarizes the recovered binder data after 33 days of aging naturally. Both the PG Grade at 1.0 kPa and 2.2 kPa provide an indication of the relative change in binder stiffness. The higher the temperature at which the binder achieves a stiffness of 1.0 kPa or 2.2 kPa the more aged that binder has become. The low temperature Stiffness Critical temperature (S-critical) and the relaxation critical temperature (m-critical) track the change in the low temperature grade of the recovered binder. These values were determined using a 4 mm dynamic shear rheometer test following the procedure of Sui, et al. referenced in this application. The parameter labeled ΔTc is determined by subtracting the m-critical value from the S-critical value. The more negative the ΔTc result becomes the more susceptible to fatigue cracking the mixture containing that binder becomes. Values of ΔTc less than −5° C. for a binder are indicative of mixture susceptible to fatigue cracking. The R-value parameter is an indication of the ability of a binder to relax stress. Binders with higher R-values have more trouble relaxing stress and consequently are more prone to cracking.

TABLE 2

Properties of Recovered Binder from the top ½ inch of the compacted specimens for all Treatments after 27 Days of Aging at 75° C.

Properties Of Recovered Binder After 27 Days Mix Aging @ 75° C.

| Sample ID | Description | PG Grade @ 1.0 kPa, °C. | PG Grade @ 2.2 kPa, °C. | S-critical Temp, °C. | m-critical Temp, °C. | ΔTc, °C. | R-Value |
|---|---|---|---|---|---|---|---|
| 1 | Untreated, 27 days at 75°, T-1, P-33, Top 0.5", Rec AC, 4 mm, HR3-4-2 | 89.8 | 83.8 | −28.32 | −25.05 | −3.27 | 2.802 |
| 2 | CQS-No Sterol, 27 days at 75°, T-5, P-3, Top 0.5", Rec AC, 4 mm, HR3-4 | 85.9 | 79.7 | −29.03 | −27.39 | −1.64 | 2.532 |
| 3 | CQS + Sterol, 27 days at 75°, T-7, P-19, Top 0.5", Rec AC, DSR, HR3-3 | 84.3 | 77.9 | −28.77 | −28.24 | −0.53 | 2.283 |

TABLE 3

Properties of Recovered Binder from the top ½ inch of the compacted specimens for all Treatments after 60 Days of Aging at 75° C.

Properties Of Recovered Binder After 60 Days Mix Aging @ 75° C.

| sample ID | Description | PG Grade @ 1.0 kPa, °C. | PG Grade @ 2.2 kPa, °C. | S-critical Temp, °C. | m-critical Temp, °C. | ΔTc, °C. | R-Value |
|---|---|---|---|---|---|---|---|
| 4 | Untreated, 60 days@ 75° C., T-11, P-29, Top 0.5", 4 mm, HR3-2 | 92.8 | 86.4 | −25.65 | −19.96 | −5.69 | 3.098 |
| 5 | CQS-No Sterol 60 days@ 75° C., T-13, P-11, Top 0.5", 4 mm, HR3-3 (1) | 93.1 | 87.0 | −26.80 | −20.35 | −6.46 | 3.008 |

TABLE 3-continued

Properties of Recovered Binder from the top ½ inch of the compacted specimens for all Treatments after 60 Days of Aging at 75° C.

| sample ID | Description | Properties Of Recovered Binder After 60 Days Mix Aging @ 75° C. | | | | | |
|---|---|---|---|---|---|---|---|
| | | PG Grade @ 1.0 kPa, ° C. | PG Grade @ 2.2 kPa, ° C. | S-critical Temp, ° C. | m-critical Temp, ° C. | ΔTc, ° C. | R-Value |
| 6 | CQS + Sterol, 60 days@ 75° C., T-19, P-20, Top 0.5", 4 mm, HR3-3 (1) | 91.0 | 84.8 | −26.96 | −23.42 | −3.54 | 2.720 |

15

TABLE 4

Properties of Recovered Binder from the top ½ inch of the compacted specimens for all Treatments after 90 Days of Aging at 75° C.

| sample ID | Description | Properties Of Recovered Binder After 90 Days Mix Aging @ 75° C. | | | | | |
|---|---|---|---|---|---|---|---|
| | | PG Grade @ 1.0 kPa, ° C. | PG Grade @ 2.2 kPa, ° C. | S-critical Temp, ° C. | m-critical Temp, ° C. | ΔTc, ° C. | R-Value |
| 7 | Untreated 90 Days @75° C., T15&P7, Top 0.5", 4 mm, HR3-2 T-avg | 101.6 | 95.2 | −24.99 | −17.09 | −7.89 | 3.304 |
| 8 | CQS- No Sterol, 90 days @ 75° C., T-8, P-16, Top 0.5", Rec AC, 4 mm, HR3-1 T-avg | 97.9 | 91.4 | −25.06 | −18.38 | −6.67 | 3.125 |
| 9 | CQS + sterol, 90 days @ 75° C., T-21, P-25, Top 0.5", Rec AC, 4 mm, HR3-1 T-avg | 98.1 | 91.2 | −23.96 | −19.07 | −4.89 | 2.939 |

TABLE 5

Properties of Recovered Binder from the top ½ inch of the compacted specimens for all Treatments after 152 Days of Aging at 75° C.

| Sample ID | Description | Properties Of Recovered Binder After 152 Days Mix Aging @ 75° C. | | | | | |
|---|---|---|---|---|---|---|---|
| | | PG Grade @ 1.0 kPa, ° C. | PG Grade @ 2.2 kPa, ° C. | S-critical Temp, ° C. | m-critical Temp, ° C. | ΔTc, ° C. | R-Value |
| 10 | Untreated 152 Days @75° C., T24&P10, Top 0.5", 4 mm, HR3-2 T-avg | 118.8 | 111.8 | −20.57 | −5.66 | −14.91 | 3.943 |
| 11 | CQS- No Sterol, 152 days @ 75° C., T-23, P-18, Top 0.5", Rec AC, 4 mm, HR3-2 T-avg | 111.4 | 104.5 | −21.92 | −10.09 | −11.83 | 3.658 |
| 12 | CQS + sterol, 152 days @ 75° C., T-28, P-27, Top 0.5", Rec AC, 4 mm, HR3-1 T-avg | 108.6 | 101.9 | −21.95 | −12.81 | −9.14 | 3.299 |

TABLE 6

Properties of Recovered Binder after 33 Days of Mix Aging Naturally

| sample ID | Description | PG Grade @ 1.0 kPa, ° C. | PG Grade @ 2.2 kPa, ° C. | S-critical Temp, ° C. | m-critical Temp, ° C. | ΔTc, ° C. | R-Value |
|---|---|---|---|---|---|---|---|
| 09-06-17-A | CQS, Untreated, 33 days outside, T-2, P-1, Top 0.5", Rec AC, 4 mm, HR3-4 | 78.9 | 72.7 | −31.58 | −31.61 | 0.03 | 2.341 |
| 09-06-17-B | CQS- No Sterol, 33 days outside, T-6, P-6, Top 0.5", Rec AC, 4 mm, HR3-3 | 79.3 | 73.3 | −30.91 | −30.46 | −0.45 | 2.364 |
| 09-06-17-C | CQS + sterol, 33 days outside, T-3, P-12, Top 0.5", Rec AC, 4 mm, HR3-4 | 78.2 | 72.0 | −30.56 | −31.06 | 0.51 | 2.190 |

The data summarized in these tables show that the binders recovered from the specimens treated with the CQS emulsion produced from the base binder with 5% sterol have the lowest values of m-critical temperatures, the least negative values of ΔTc and lowest R-values compared to the other two treatments. At every aging step the sterol containing treatment retarded the impact of aging resulting from conditioning temperature and oxidative hardening.

FIGS. 2 to 6 show the data from Tables 1 through 5 plotted for easier interpretation. For aged asphalt binders the low temperature m-critical value (FIG. 2) is the low temperature PG grade of the binder. The m-critical temperature is obtained from the slope measured at 60 seconds of the relaxation modulus master curve. The m-critical slope value can be obtained from the Bending Beam Rheometer or test (ASTM D6648) or from the 4 mm DSR test as shown by the research of Sui and Farrar at Western Research Institute. The more readily a binder can relax stresses the lower will be binder failing temperature. The sterol addition showed improving the ability of the binder to relax stresses at low and intermediate temperatures.

Figure 3:
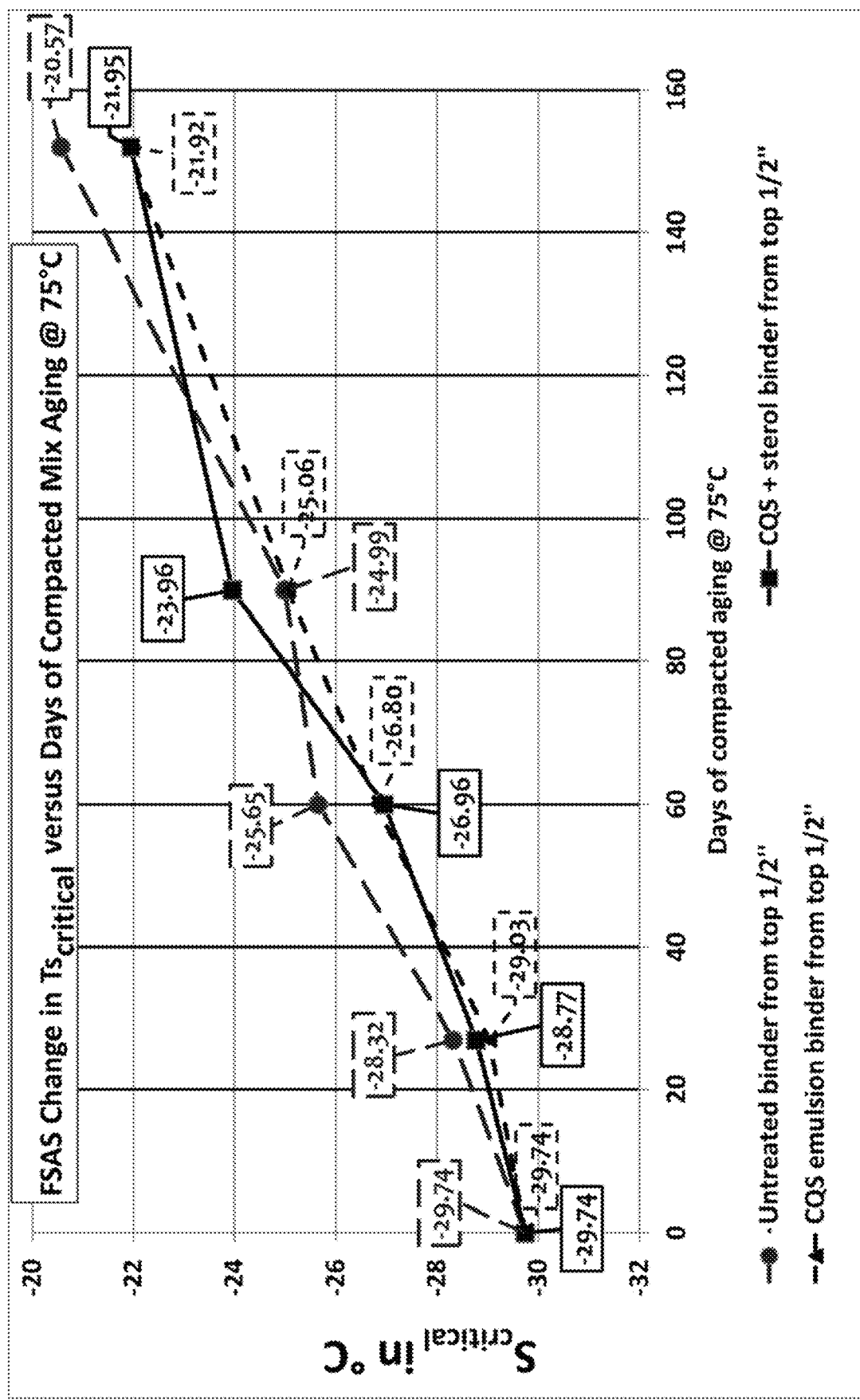
FIG. 3 graphically depicts S-critical compared to days of oven aging at 75° C.

FIG. 3 is a plot of the low temperature S-critical or Stiffness Critical value at the different aging times. FIG. 3 shows that there is minor variation in the S-critical values between treatments at any given aging time. It is also worth emphasizing that although the S-critical temperatures are colder than the m-critical temperatures the PG binder specifications for the low temperature failing grade of the binder is based on the warmer of these two low temperature values. Therefore, if an additive can slow down the rate at which the m-critical value degrades then the binder will have better low temperature performance.

Figure 4:
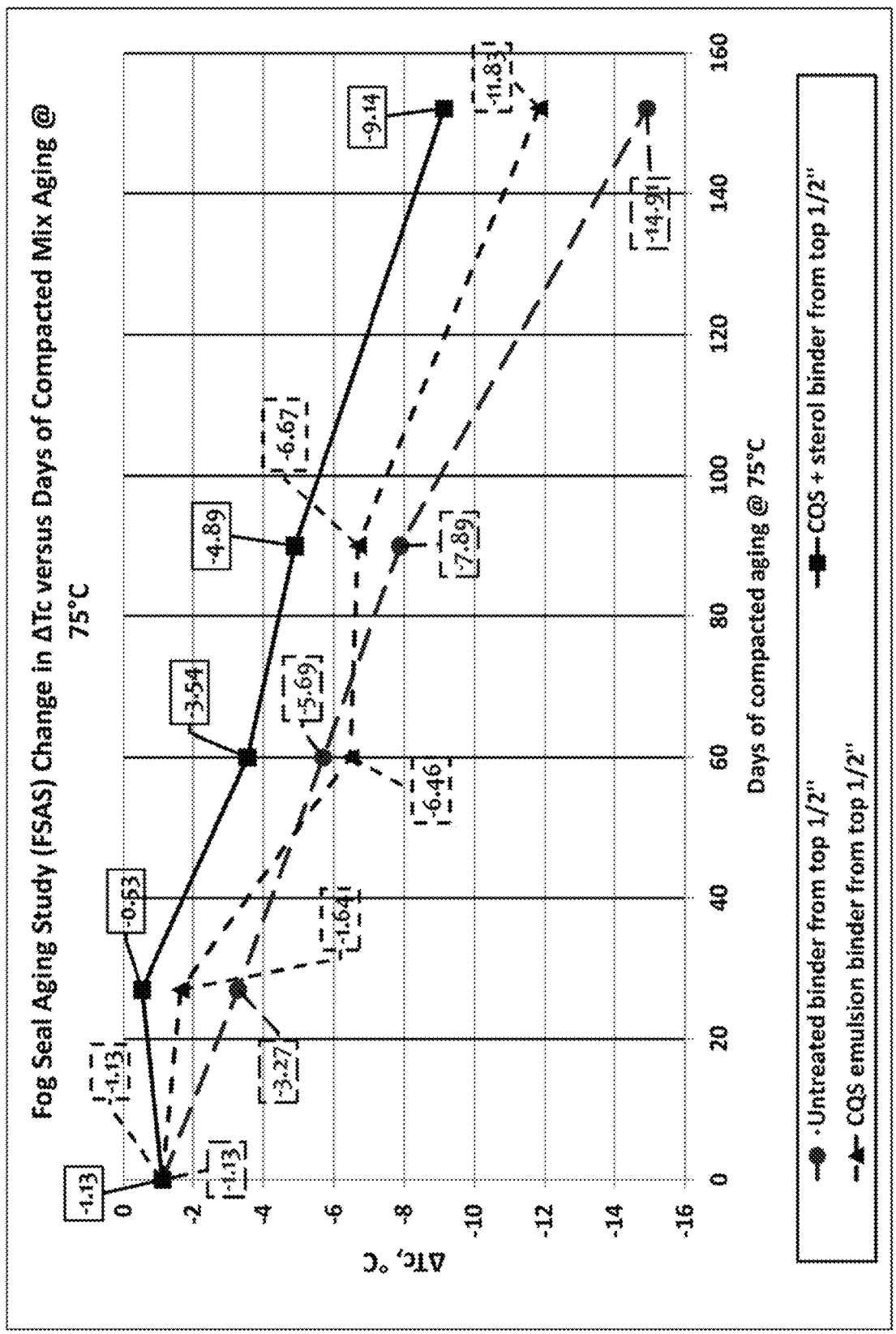
FIG. 4 graphically depicts $\Delta Tc$ compared to days of oven aging at 75° C.

FIG. 4 is a plot of the ΔTc value at the different aging times. FIG. 4 shows that initially (at 27 days) the addition of both the CQS and CQS+sterol emulsions to the mix specimens improved the ΔTc values for those two treatments relative to the original ΔTc at zero time. The recovered binder for the untreated samples shows that ΔTc decreased by more than 2° C., whereas ΔTc for the plain CQS treated samples decreased only about 0.5° C. The ΔTc value for the CQS+sterol treated samples increased by 0.6° C. The additional asphalt binder added to the original specimens accounted for a reduced rate of aging for the CQS treated specimens and the additional asphalt binder plus the impact of the sterol accounted for the improvement of the recovered binder after 27 days of aging relative to the ΔTc of zero-day aged mix. After both 60 and 90 days of aging the ΔTc values of binder recovered from the CQS+sterol treated specimens were still greater than −5° compared to ΔTc for the untreated and CQS treated specimens. Even after 152 days of aging the CQS+sterol treated specimens have a better ΔTc value compared to the other treatments.

Figure 5:
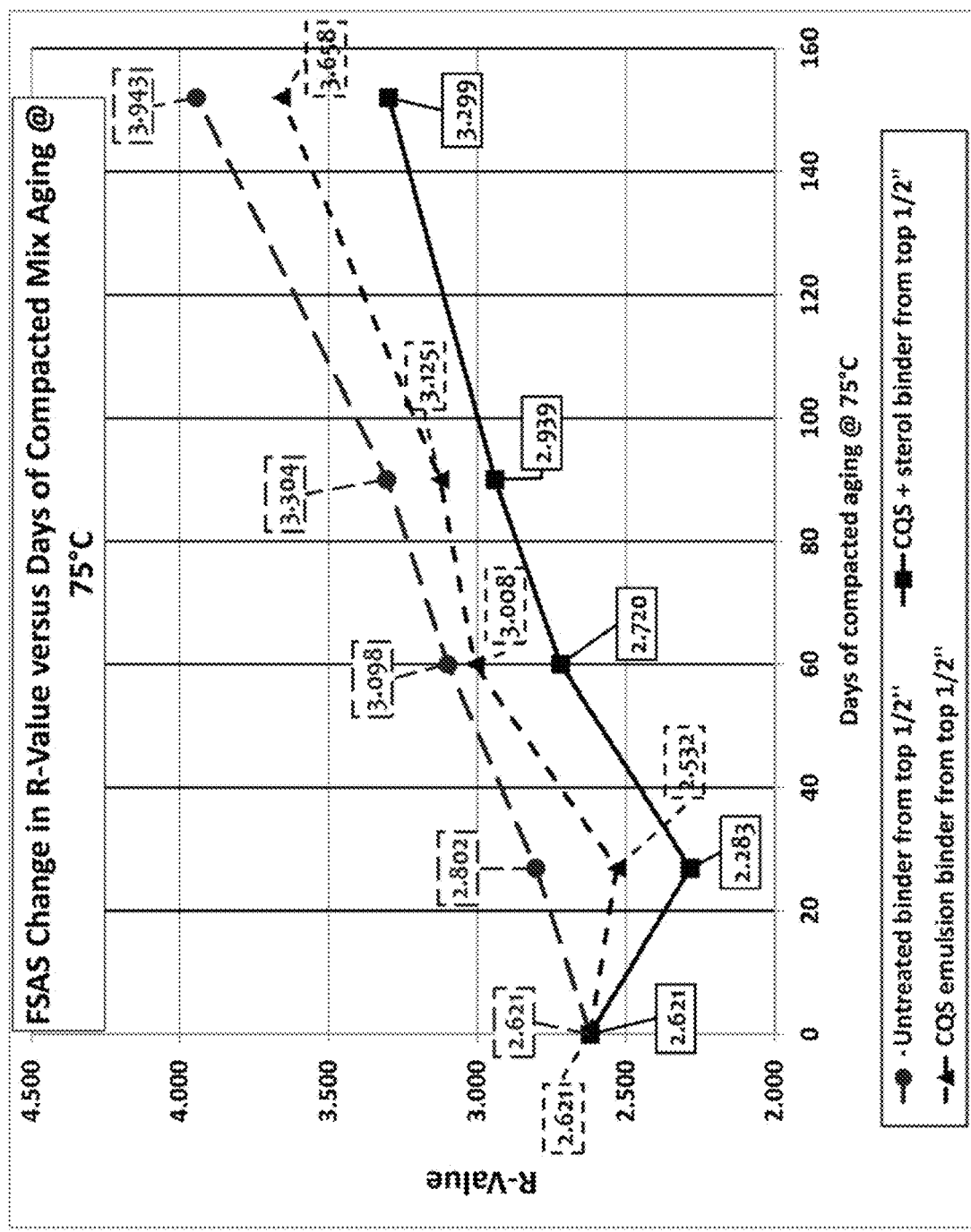
FIG. 5 graphically depicts R-value compared to days of oven aging at 75° C.

FIG. 5 is a plot of the binder Rheological index or R-Value for the different treatments. The R-value is another indicator of the ability of a binder to relax stress. Binders with increasing R-Values have decreased ability to relax stress. It is desirable to keep R-Value under 3 and as FIG. 5 shows the initial application of the emulsion treatments reduced the R-values for those two treatments, but by 60 hours of aging the untreated and CQS treated specimens had values greater than 3. Through the entire aging sequence, the CQS+sterol treated specimens had consistently better R-values than the other treatments.

Figure 6:
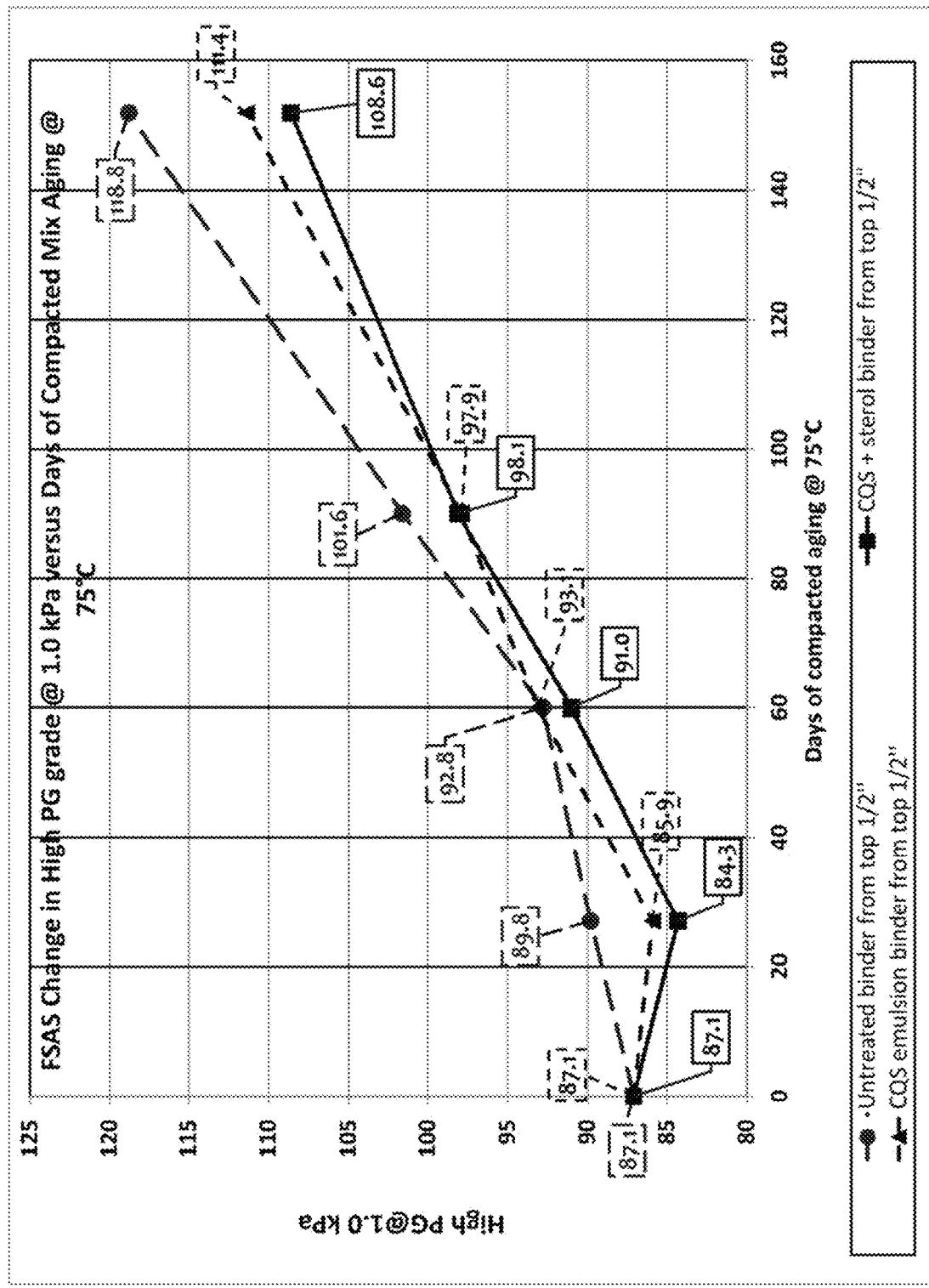
FIG. 6 graphically depicts high temperature PG grade at 1.0 kPa compared to days of aging at 75° C.

FIG. 6 is a plot of the high temperature PG grade of binders recovered from the various treatments with aging time. The data shows relatively minor variation in high temperature grade with aging; however, the CQS+sterol treatment does consistently have the lowest high temperature value. The high temperature property of the binder is not highly significant as long as the binder is stiff enough to resist rutting and for a typical upper Midwestern US climate, all of these binders possess sufficient stiffness.

Tables 6 and 7 show the properties of binders recovered from the 2nd ½ inch of the compacted specimens after 60 and 152 days of aging. The purpose of obtaining this data at these intervals was to show the aging of the binder in these layers compared to aging of the binder in the top ½ inch mixture layers. With the exception of the ΔTc value for the 2nd ½ inch binder from the untreated specimen the properties of these recovered binders at 60 days and at 152 days are similar. The 60 day untreated sample with a ΔTc of −3.80° C. may be due to the warmer S-critical value for the untreated sample compared to the CQS and CQS+sterol treatments. A warmer S-critical value indicates a greater aging of the stiffness failure temperature compared to the treated samples and could be due to more oxygen migration into the 2nd ½ inch of the mix. Because the untreated samples did not have any emulsion treatment, the surface half inch of those untreated specimens would have a greater opportunity for oxygen to permeate the mix. The R-value for the untreated 60 day recovered binder is similar to the other two treatments which is consistent with similar properties of relaxation and also consistent with the similarities of the m-critical properties of all three treatments for the 2nd ½ inch recovered binders.

Figure 7:
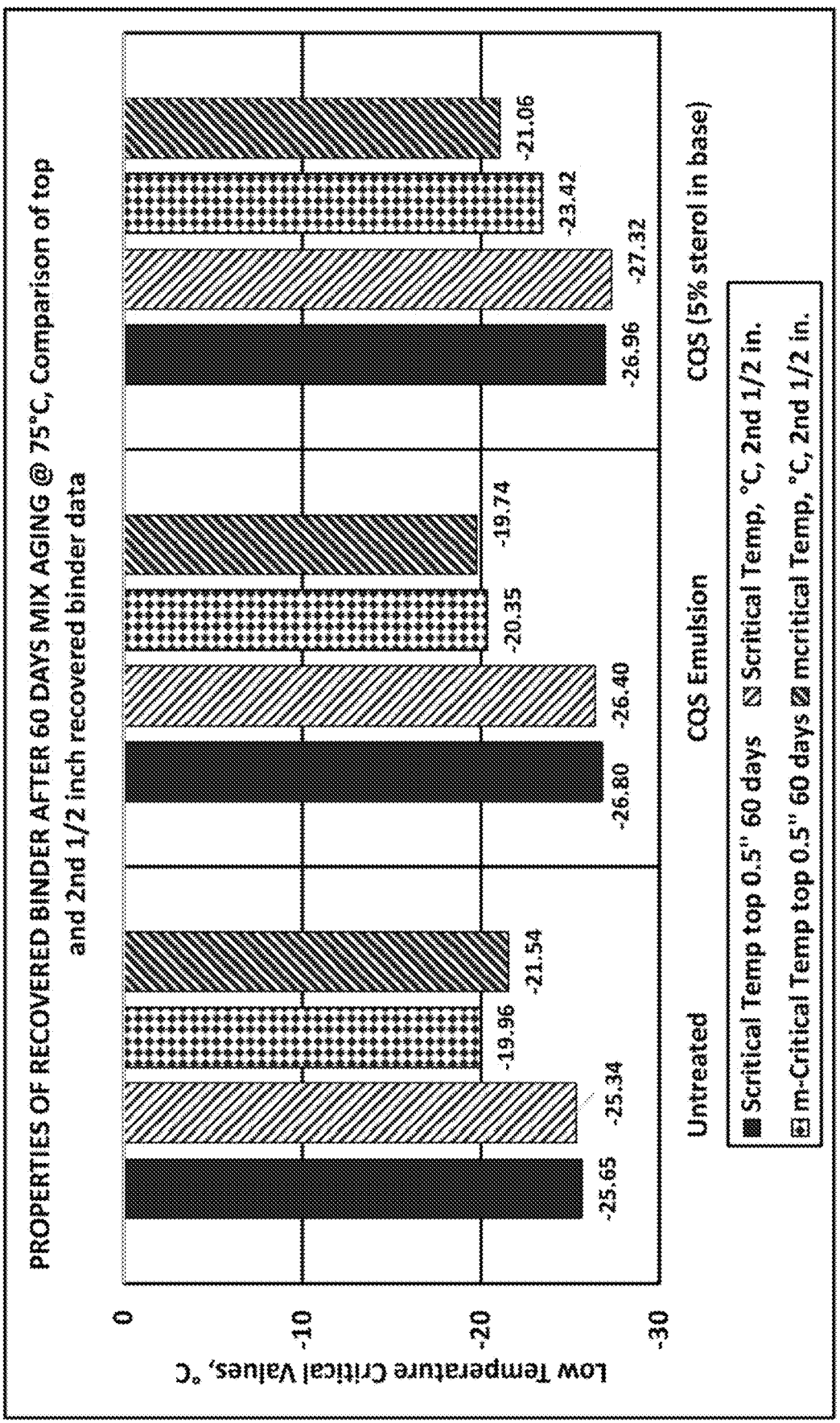
FIG. 7 graphically depicts S-critical and m-critical properties of binder recovered from the top and second half inch of compacted specimens after 60 days of oven aging.
Figure 8:
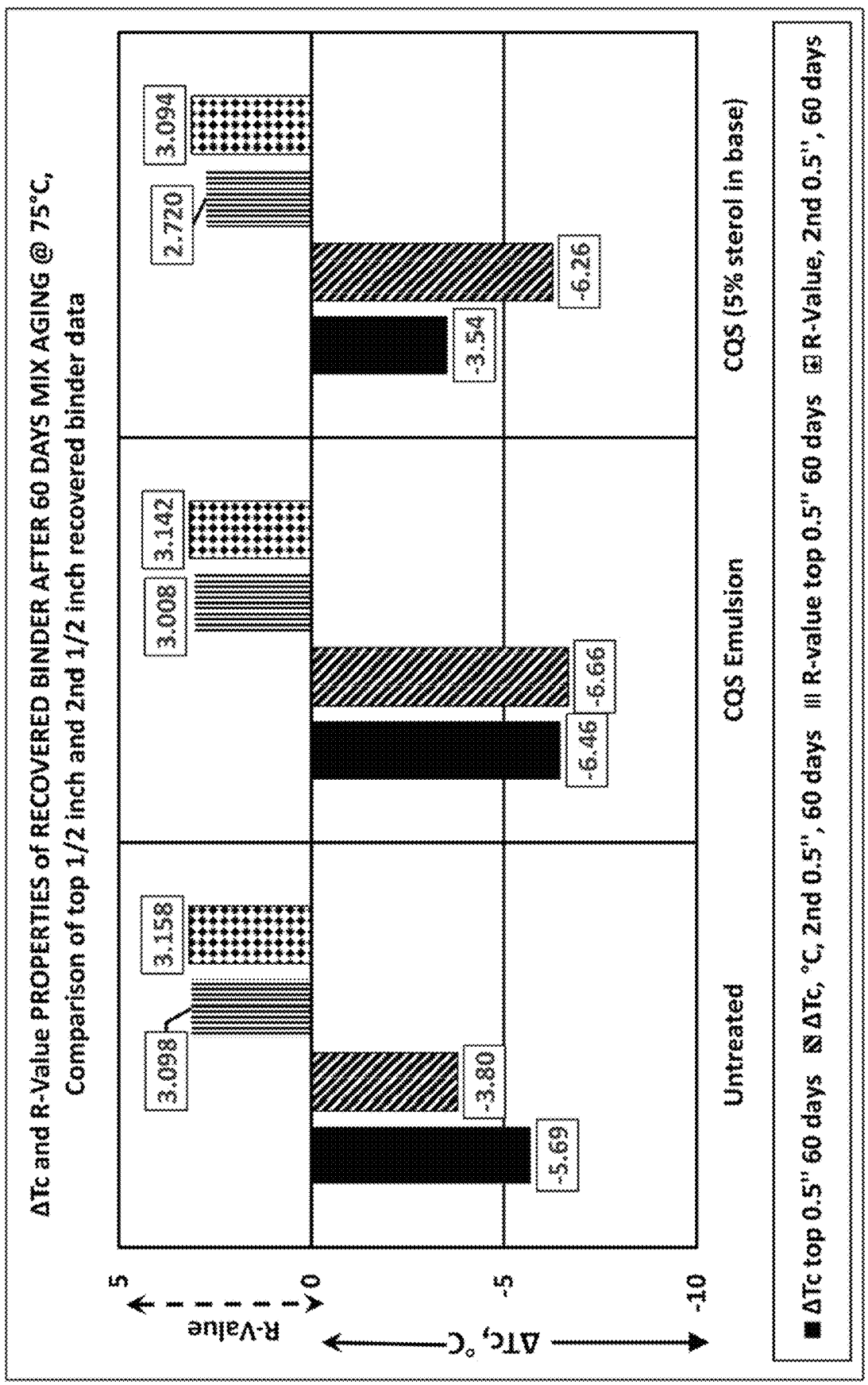
FIG. 8 graphically depicts $\Delta Tc$ and R-Value properties of binder recovered from the top and second half inch of compacted specimens after 60 days of oven aging.
Figure 9:
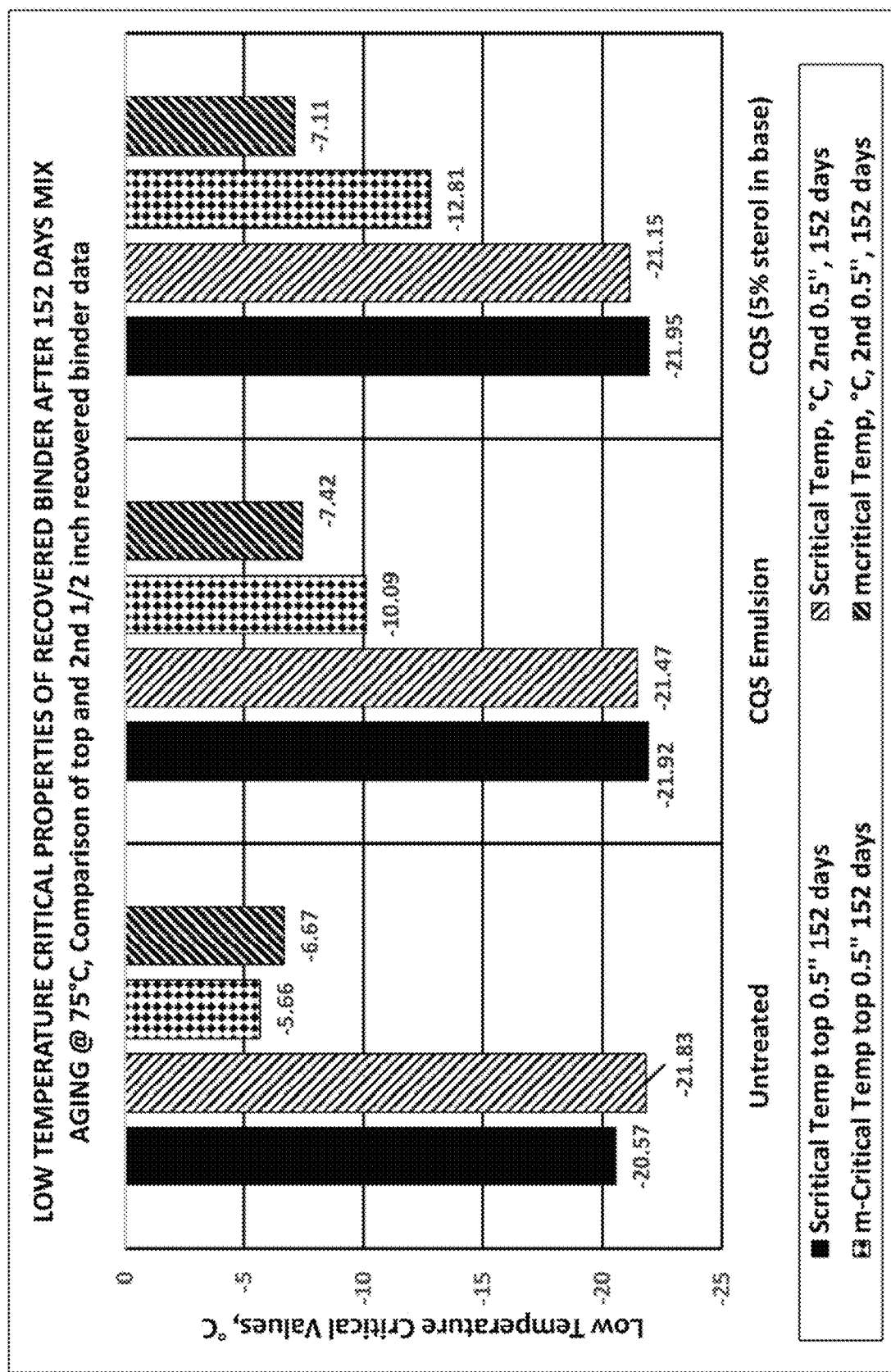
FIG. 9 graphically depicts S-critical and m-critical properties of binder recovered from the top and second half inch of compacted specimens after 152 days of oven aging.
Figure 10:
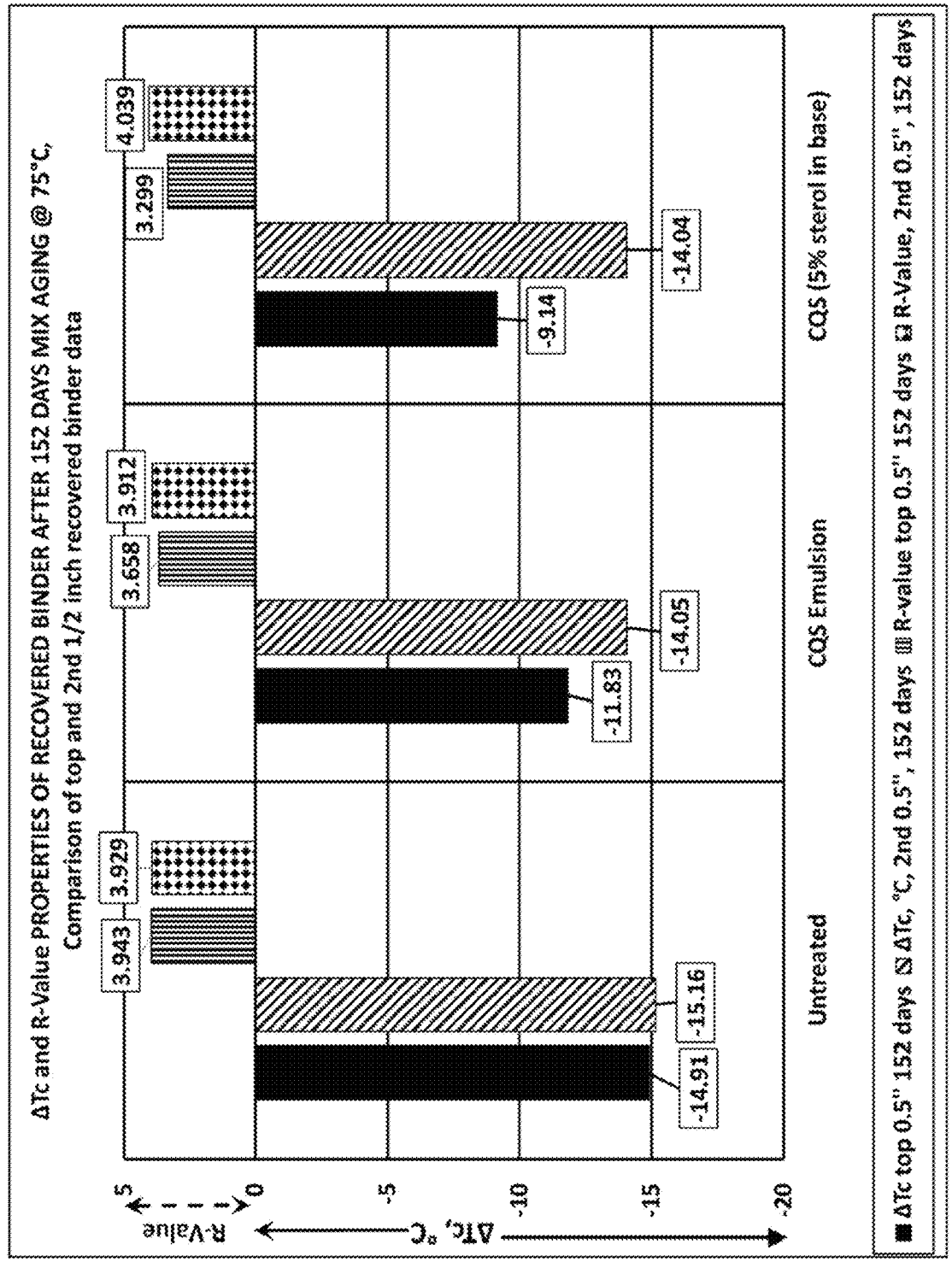
FIG. 10 graphically depicts $\Delta Tc$ and R-Value properties of binder recovered from the top and second half inch of compacted specimens after 152 days of oven aging.

FIG. 7 shows bar chart comparisons of the S-critical and m-critical data between the top ½ inch and second ½ inch recovered binder at 60 days of aging. FIG. 8 shows comparison between the ΔTc and R-Value properties for the same binders at 60 days of aging. FIGS. 9 and 10 show similar respective plots for the binders recovered from the top and second ½ inch of binders recovered after 152 days of aging.

The S-critical values show hardly any variation with respect to depth for any treatment and the m-critical value for the top ½ inch of the CQS+sterol treatment exhibits a 2.4° C. better low temperature m-critical value than the binder from the 2nd half inch. The fact that the CQS treated specimens exhibited an m-critical value 0.6° C. better than the second half inch recovered binder shows that the additional binder added to the mix was not the source of the more greatly improved m-critical value in the CQS+sterol specimens and shows that the fog seal application of the emulsion containing the sterol resides in the top half inch layer.

The data plotted in FIG. 8 shows ΔTc values for the top half inch and second half inch binders after 60 days. The R-value for the top half inch of the sterol treated mix was also lower than the second half inch.

FIG. 9 shows S-critical and m-critical comparisons after 152 days of aging. The S-critical data is very similar for all treatments for both layers. The m-critical values show definite differences. The second half inch layers were very similar with the untreated specimens having a slightly warmer m-critical temperature. The CQS treated specimens had a m-critical value 2.67° C. cooler (i.e. better) for the top half inch compared to the second half inch (−10.09° C. vs. −7.42° C.). This is attributable to the extra asphalt added in the fog seal. The top half inch of the CQS+sterol however had an m-critical value that was 2.7° C. cooler (i.e. better) than the CQS only treatment and 5.7° C. cooler (i.e. better) than the second layer of the CQS+sterol treatment specimens. This shows that sterol treated specimens resides in the top half inch. The CQS treated results also show that the fog seal treatment in general resides in the top half inch while at the same time emphasizing that just applying the asphalt emulsion does not provide the same age retarding benefits as having the sterol additive present in the treatment.

FIG. 10 compares the ΔTc and R-values for the three treatments after 152 days of conditioning. The ΔTc values for both layers of the untreated specimens and the second half-inch of the CQS and CQS+sterol treatments are all similar with the emulsion treated specimens being slightly better, most likely due to the asphalt added to the surface of those specimens. The CQS treated specimens had a top half-inch layer ΔTc 2.2° C. better than the second half-inch binder, but the CQS+sterol top half inch layer ΔTc was 5° C. better than the second half inch layer. The R-value data also shows similar relative performance. The untreated specimens have nearly identical R-values, the CQS treated specimens show that the top half inch binder has a 0.25 R-value improvement over the second half inch binder and the CQS+sterol treated specimens have a top half inch binder has a 0.74 R-value improvement over the binder in the second half inch.

The invention claimed is:

1. A method of road paving comprising:
providing sterol-containing asphalt binder emulsion, wherein sterol is added to an asphalt binder from 0.5 to 15 wt. % of the sterol based on the asphalt binder before emulsification;
combining the sterol-containing asphalt binder emulsion with aggregate to form an asphalt paving material;
applying the asphalt paving material atop an asphalt pavement layer; and
compacting the applied asphalt paving material to form a road pavement having a sterol-containing topcoat layer.

2. The method of claim 1, wherein the asphalt pavement material is applied to the topmost layer of the road pavement as a thin lay comprising an average thickness up to about 65 mm.

3. The method of claim 1, wherein the pavement material is applied to the topmost layer of the road pavement as a thin lay comprising an average thickness up to about 12 mm to about 38 mm.

4. The method of claim 1, wherein the sterol is 1 to 10 wt. % of the asphalt binder weight.

5. The method of claim 1, wherein the sterol is 1 to 3 wt. % of the asphalt binder weight.

6. The method of claim 1, wherein the sterol comprises a pure sterol, a crude sterol, cholesterol, a plant sterol or combinations thereof.

7. The method of claim 6, wherein the crude sterol is obtained from a bio-derived source or distilled residue of the bio-derived source.

8. The method of claim 6, wherein the crude sterol comprises a tall oil pitch.

9. The method of claim 6, wherein the crude sterol comprises crude sterol derived from soybean oil, or wherein the crude sterol comprises crude sterol derived from corn oil.

10. The method of claim 1, further comprising adding reclaimed asphalt binder from recycled asphalt pavement (RAP), recycled asphalt shingles (RAS), softening agents, or a combination of RAP, RAS, and softening agents.

11. The method of claim 1, wherein the sterol-containing asphalt binder provides a ΔTc of greater than or equal to −5.0° C.

12. A paved road made from the asphalt paving material method of claim 1.

13. A paved road made from the asphalt paving material of claim 10.

* * * * *